US010547475B1

(12) United States Patent
Gagnon

(10) Patent No.: US 10,547,475 B1
(45) Date of Patent: Jan. 28, 2020

(54) SYSTEM AND METHOD FOR MEASUREMENT AND ADAPTATION OF PULSE RESPONSE CURSORS TO NON ZERO VALUES

(71) Applicant: Cadence Design Systems, Inc., San Jose, CA (US)

(72) Inventor: Mathieu Gagnon, Verdun (CA)

(73) Assignee: CADENCE DESIGN SYSTEMS, INC., San Jose, CA (US)

(*) Notice: Subject to any disclaimer, the term of this patent is extended or adjusted under 35 U.S.C. 154(b) by 0 days.

(21) Appl. No.: 16/283,320

(22) Filed: Feb. 22, 2019

(51) Int. Cl.
H04L 25/03 (2006.01)

(52) U.S. Cl.
CPC ........... H04L 25/03057 (2013.01); *H04L 2025/03369* (2013.01); *H04L 2025/03636* (2013.01)

(58) Field of Classification Search
CPC ..... H04L 25/03057; H04L 2025/03369; H04L 2025/03636
See application file for complete search history.

(56) References Cited

U.S. PATENT DOCUMENTS

| | | | | |
|---|---|---|---|---|
| 7,831,005 B2* | 11/2010 | Kuwata | ............. | H04L 7/0091 375/371 |
| 8,024,142 B1* | 9/2011 | Gagnon | ............. | G01R 19/2509 702/69 |
| 8,724,688 B1* | 5/2014 | Gagnon | ............. | H04L 25/03057 375/232 |
| 8,848,774 B2* | 9/2014 | Zhong | ............. | H04L 25/03038 375/232 |
| 8,855,186 B2* | 10/2014 | Tan | ............. | H04L 25/03885 375/213 |
| 8,879,615 B1* | 11/2014 | Gagnon | ............. | H04L 25/03305 375/224 |
| 8,885,695 B1* | 11/2014 | Kang | ............. | H04L 25/03057 375/227 |
| 8,885,699 B2* | 11/2014 | Gagnon | ............. | H04L 25/03057 375/232 |
| 9,148,130 B1* | 9/2015 | Naviasky | ............. | H03K 3/015 |
| 9,191,245 B2* | 11/2015 | Tan | ............. | H04L 25/03057 |
| 9,531,529 B1* | 12/2016 | Gagnon | ............. | H03M 9/00 |
| 9,544,864 B1* | 1/2017 | Takahashi | ............. | H04W 56/0015 |
| 9,553,742 B1* | 1/2017 | Xu | ............. | H04L 25/03828 |
| 9,559,878 B2* | 1/2017 | Giaconi | ............. | H04L 7/0041 |
| 9,559,880 B1* | 1/2017 | Cirit | ............. | H04L 25/08 |
| 9,571,309 B1* | 2/2017 | Sakai | ............. | H04L 25/03057 |
| 9,589,096 B1* | 3/2017 | Gupta | ............. | G06F 17/5036 |

(Continued)

*Primary Examiner* — James M Perez
(74) *Attorney, Agent, or Firm* — Foley & Lardner LLP

(57) ABSTRACT

A receiver device includes circuitry and memory. The circuitry converts an input signal into a data signal that includes data symbols transmitted in successive unit intervals (UIs), determines a first threshold associated with a first symbol type, adjusts a gain of the receiver device such that an average amplitude of data signal samples, when receiving data symbols having the first symbol type, corresponds to the first threshold, determines a second threshold that corresponds to an average amplitude of the data signal samples when data symbols of a current UI have the first symbol type and data symbols of a first UI, at a first determined time distance from the current UI, have a second symbol type, and computes, as a first cursor value associated with the first UI, a first difference between the first threshold and the second threshold, multiplied by a first constant.

20 Claims, 14 Drawing Sheets

(56) References Cited

U.S. PATENT DOCUMENTS

| | | | | |
|---|---|---|---|---|
| 9,645,965 B2* | 5/2017 | Das Sharma | ....... | G06F 13/4282 |
| 9,800,438 B1* | 10/2017 | Zhang | ............... | H04L 25/03885 |
| 9,819,520 B1* | 11/2017 | Huss | ................ | H04L 25/03343 |
| 9,819,523 B2* | 11/2017 | Lee | ...................... | H04B 7/0682 |
| 9,998,303 B1* | 6/2018 | Huss | ................ | H04L 25/03057 |
| 10,114,733 B1* | 10/2018 | Varghese | ............ | G06F 11/3664 |
| 10,333,741 B2* | 6/2019 | Shokrollahi | ........ | H04L 25/0272 |
| 2004/0203559 A1* | 10/2004 | Stojanovic | ............ | H04L 25/063 |
| | | | | 455/403 |
| 2005/0019042 A1* | 1/2005 | Kaneda | ................ | H04B 10/695 |
| | | | | 398/208 |
| 2005/0134307 A1* | 6/2005 | Stojanovic | ............ | H04L 25/028 |
| | | | | 326/31 |
| 2006/0256892 A1* | 11/2006 | Momtaz | ................ | H04L 25/061 |
| | | | | 375/317 |
| 2007/0110199 A1* | 5/2007 | Momtaz | ................ | H04L 7/0331 |
| | | | | 375/350 |
| 2007/0201544 A1* | 8/2007 | Zhu | ................... | H04L 25/03057 |
| | | | | 375/229 |
| 2007/0217558 A1* | 9/2007 | Abel | ..................... | H04L 7/0008 |
| | | | | 375/355 |
| 2010/0177816 A1* | 7/2010 | Malipatil | .......... | H04L 25/03057 |
| | | | | 375/233 |
| 2010/0329325 A1* | 12/2010 | Mobin | .............. | H04L 25/03057 |
| | | | | 375/232 |
| 2013/0148712 A1* | 6/2013 | Malipatil | ............ | H04L 25/0307 |
| | | | | 375/233 |
| 2014/0133544 A1* | 5/2014 | Gagnon | ............ | H04L 25/03057 |
| | | | | 375/233 |
| 2015/0188693 A1* | 7/2015 | Giaconi | ................ | H04L 7/0041 |
| | | | | 375/233 |
| 2018/0048494 A1* | 2/2018 | Mobin | .............. | H04L 25/03057 |

* cited by examiner

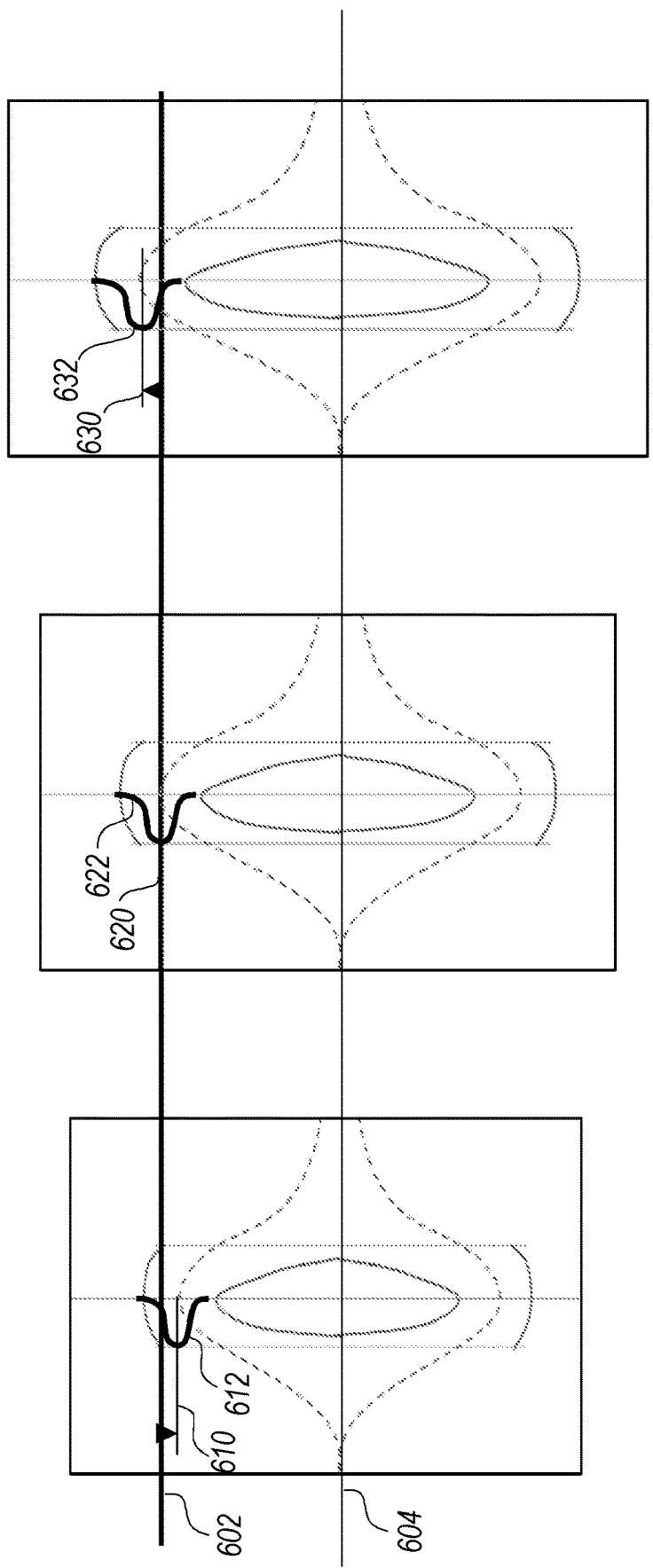

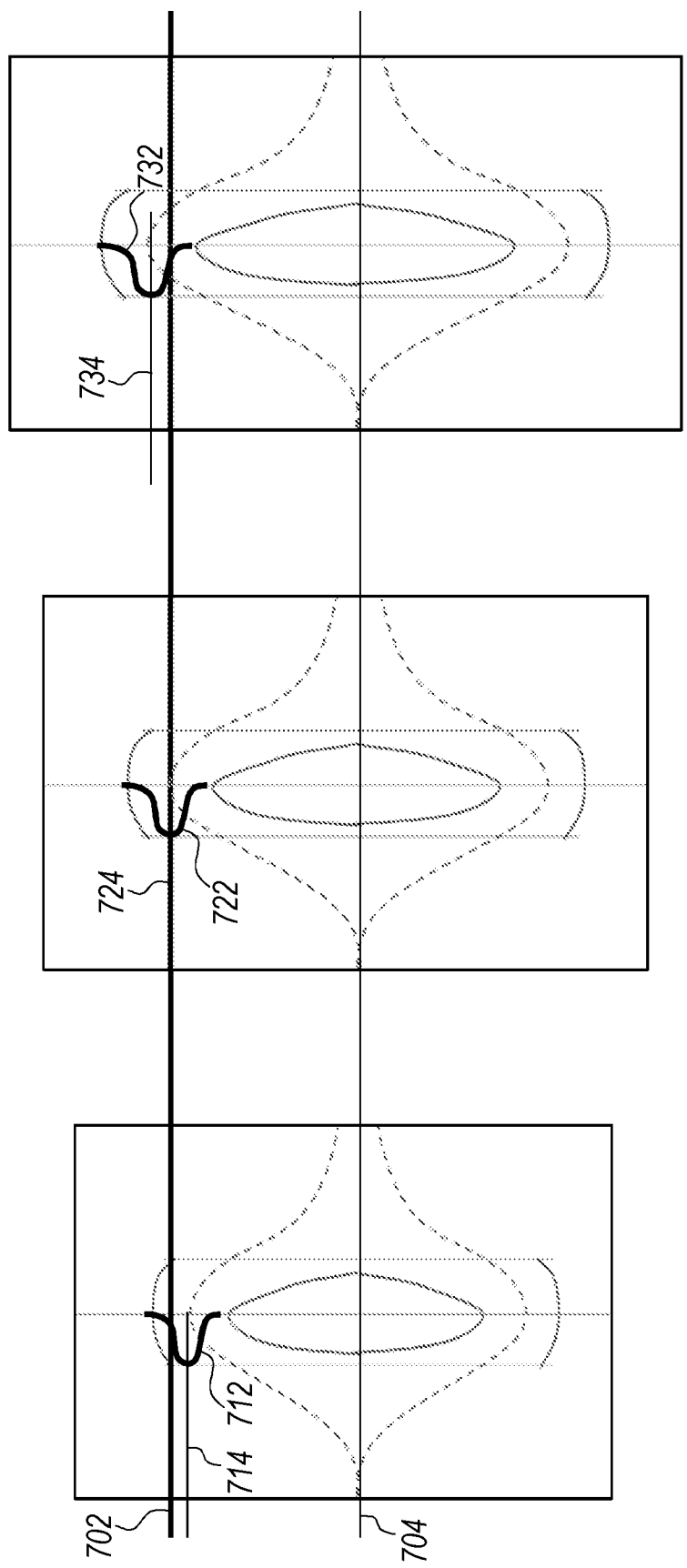

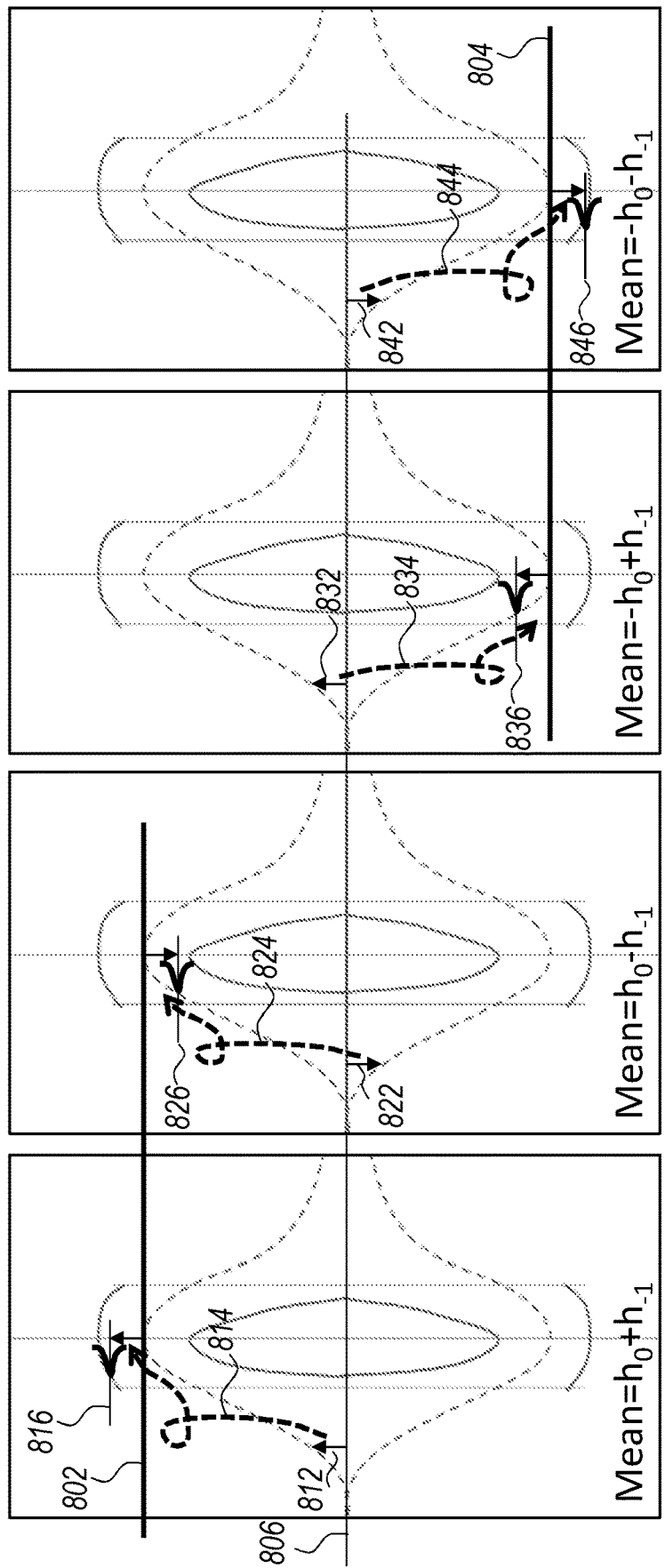

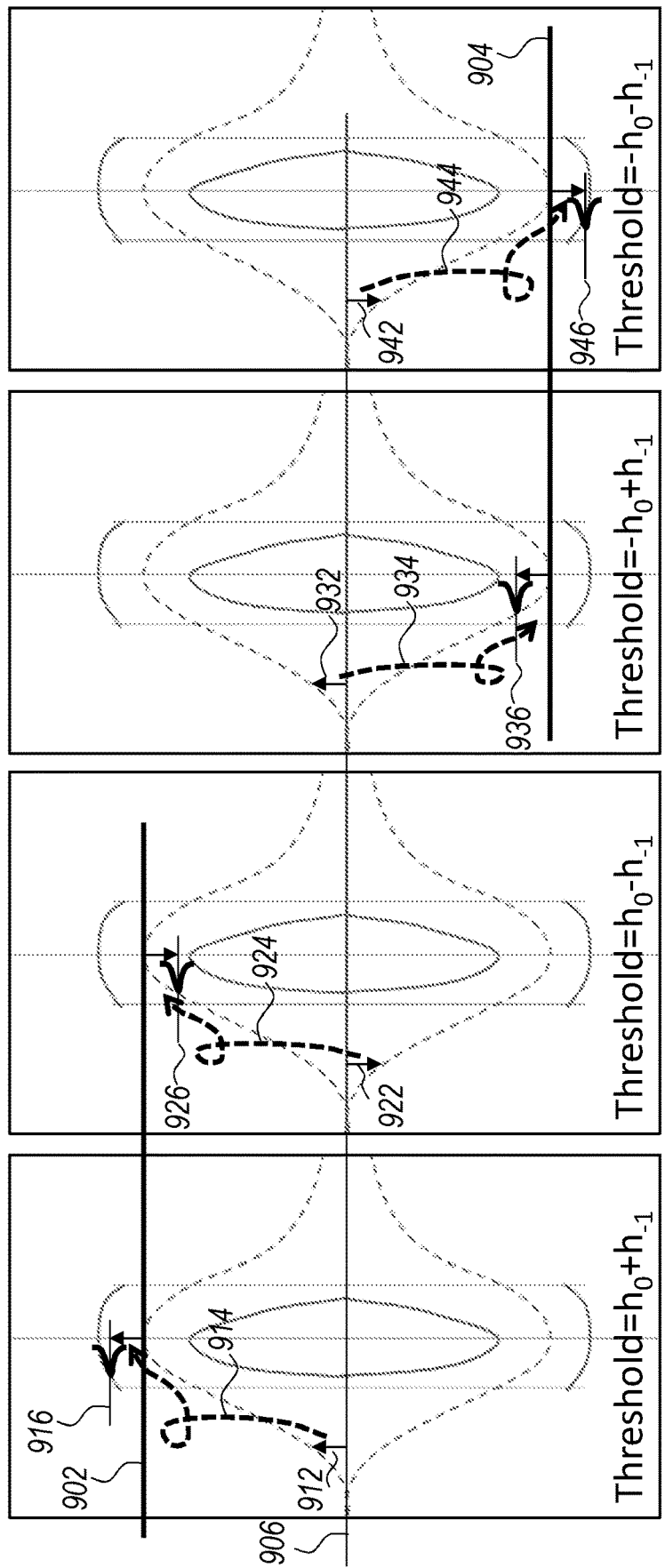

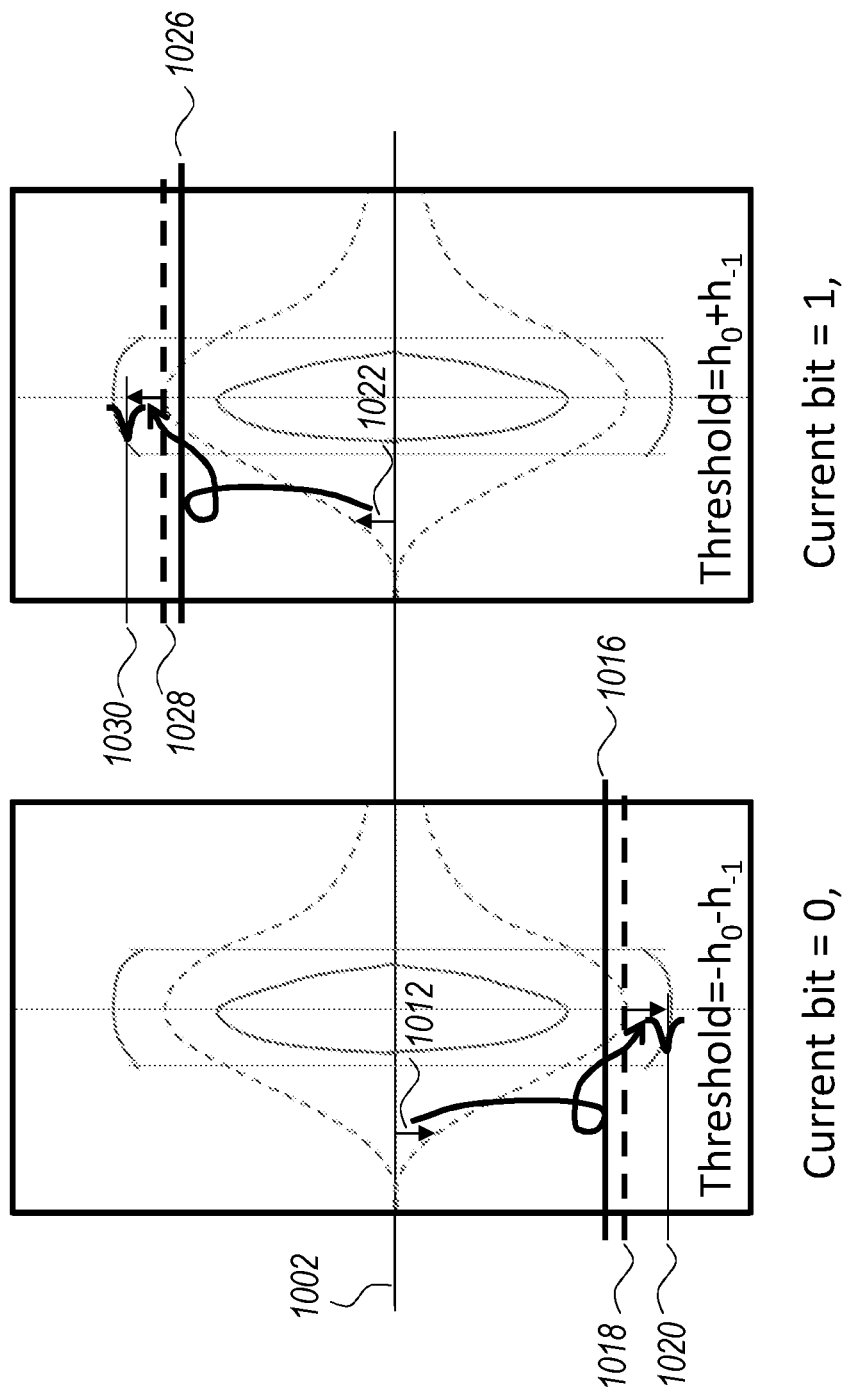

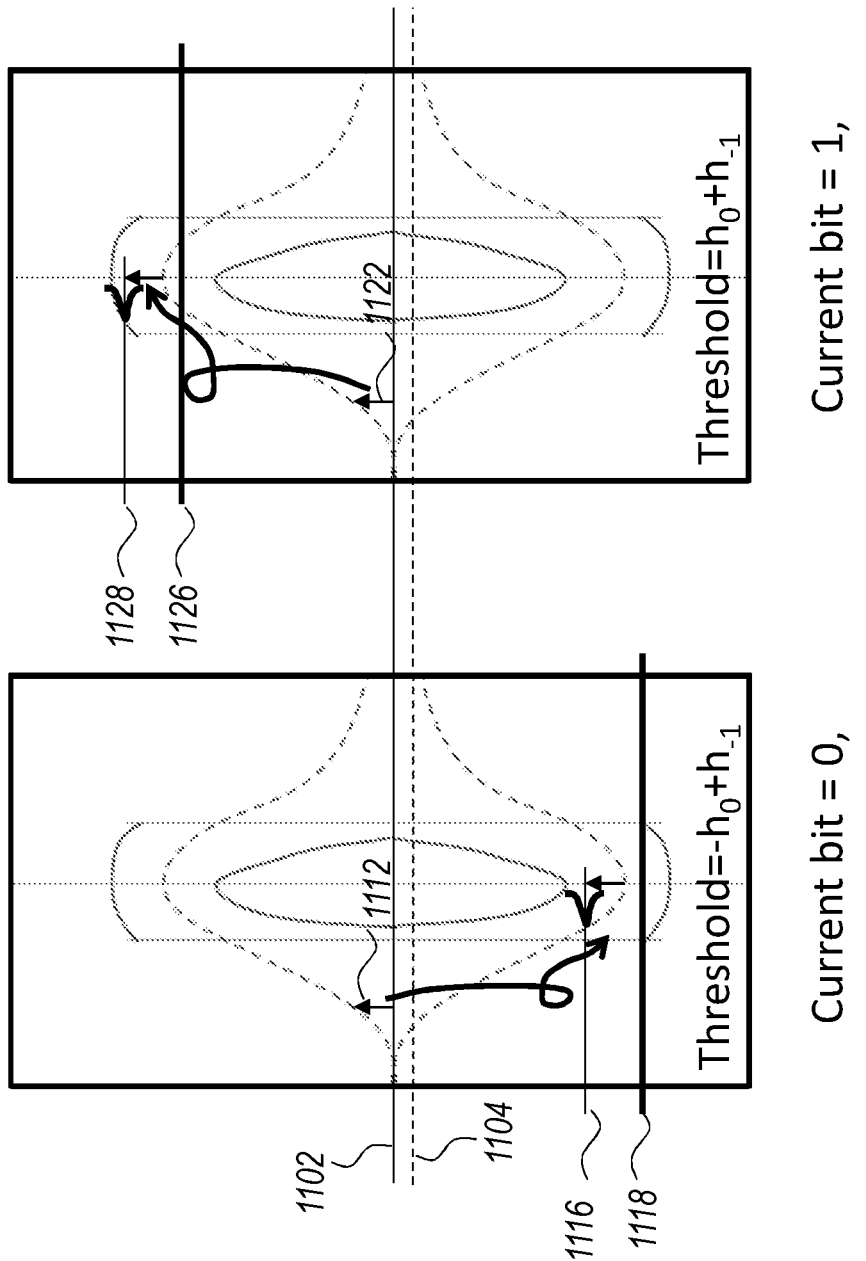

US 10,547,475 B1

SYSTEM AND METHOD FOR MEASUREMENT AND ADAPTATION OF PULSE RESPONSE CURSORS TO NON ZERO VALUES

TECHNICAL FIELD

Embodiments of the present disclosure relate to system and method of measuring the value of pulse response cursors and to system and method of adapting cursors to a non-zero value which may be a value previously measured.

BACKGROUND

A decision feedback equalizer (DFE) of a receiver can be adaptively controlled by adapting a cursor (e.g., a pulse response during a unit interval (UI)) to a target amplitude. Such DFE cursor adaptation may be performed by correlating a digital value at some distance with an error.

When adapting a cursor in a receiver in a communication system, metrics may be useful to assess the quality of each equalization object (e.g., adapted cursors, sampling instant, etc.) or to maintain such equalization objects. Moreover, if the input pattern provided for adapting the DFE taps contains data correlations, the adaptation result could be affected. For example, if the data contains correlations, the final DFE tap values may be shifted from their optimal values. To provide metrics and correct such pattern correlations while adapting DFE taps, there is a need to measure an amplitude of a cursor.

SUMMARY

The present embodiments relate to systems and methods for measuring the value of pulse response cursors and adapting cursors to a non-zero value which may be a value previously measured.

According to certain aspects, embodiments provide a method for measuring values of pulse response cursors in an input signal from a transmitter. The method may include converting, by first circuitry of a receiver device, the input signal into a data signal that includes data symbols transmitted in successive unit intervals (UIs). The method may also include determining, by the first circuitry, a first threshold associated with a first symbol type. The method may also include adjusting, by the first circuitry, a gain of the receiver device such that an average amplitude of data signal samples, when receiving data symbols having the first symbol type, corresponds to the first threshold. The method may also include determining, by the first circuitry, a second threshold that corresponds to an average amplitude of the data signal samples when data symbols of a current UI have the first symbol type and data symbols of a first UI, at a first determined time distance from the current UI, have a second symbol type. The method may also include computing, by the first circuitry as a first cursor value associated with the first UI, a first difference between the first threshold and the second threshold, multiplied by a first constant.

According to other aspects, embodiments provide a receiver device for receiving an input signal from a transmitter and measuring values of pulse response cursors in the input signal. The receiver device may include first circuitry and memory. The first circuitry may be configured to convert the input signal into a data signal that includes data symbols transmitted in successive unit intervals (UIs), determine a first threshold associated with a first symbol type, adjust a gain of the receiver device such that an average amplitude of data signal samples, when receiving data symbols having the first symbol type, corresponds to the first threshold, determine a second threshold that corresponds to an average amplitude of data signal samples when data symbols of a current UI have the first symbol type and data symbols of a first UI, at a first determined time distance from the current UI, have a second symbol type, and compute, as a first cursor value associated with the first UI, a first difference between the first threshold and the second threshold, multiplied by a first constant.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 6(a), FIG. 6(b) and FIG. 6(c) are eye diagrams illustrating an example aspect of adapting a main cursor according to some embodiments;

FIG. 7(a), FIG. 7(b) and FIG. 7(c) are eye diagrams illustrating an example aspect of measuring a main cursor according to some embodiments;

FIG. 8(a), FIG. 8(b), FIG. 8(c) and FIG. 8(d) are eye diagrams illustrating an example aspect of adapting cursors other than the main cursor;

FIG. 9(a), FIG. 9(b), FIG. 9(c) and FIG. 9(d) are eye diagrams illustrating an example aspect of measuring cursors other than the main cursor according to some embodiments;

FIG. 10(a) and FIG. 10(b) are eye diagrams illustrating an example aspect of measuring cursors other than the main cursor according to some embodiments;

FIG. 11(a) and FIG. 11(b) are eye diagrams illustrating an example aspect of measuring cursors other than the main cursor according to some embodiments;

DETAILED DESCRIPTION

Figure 1:
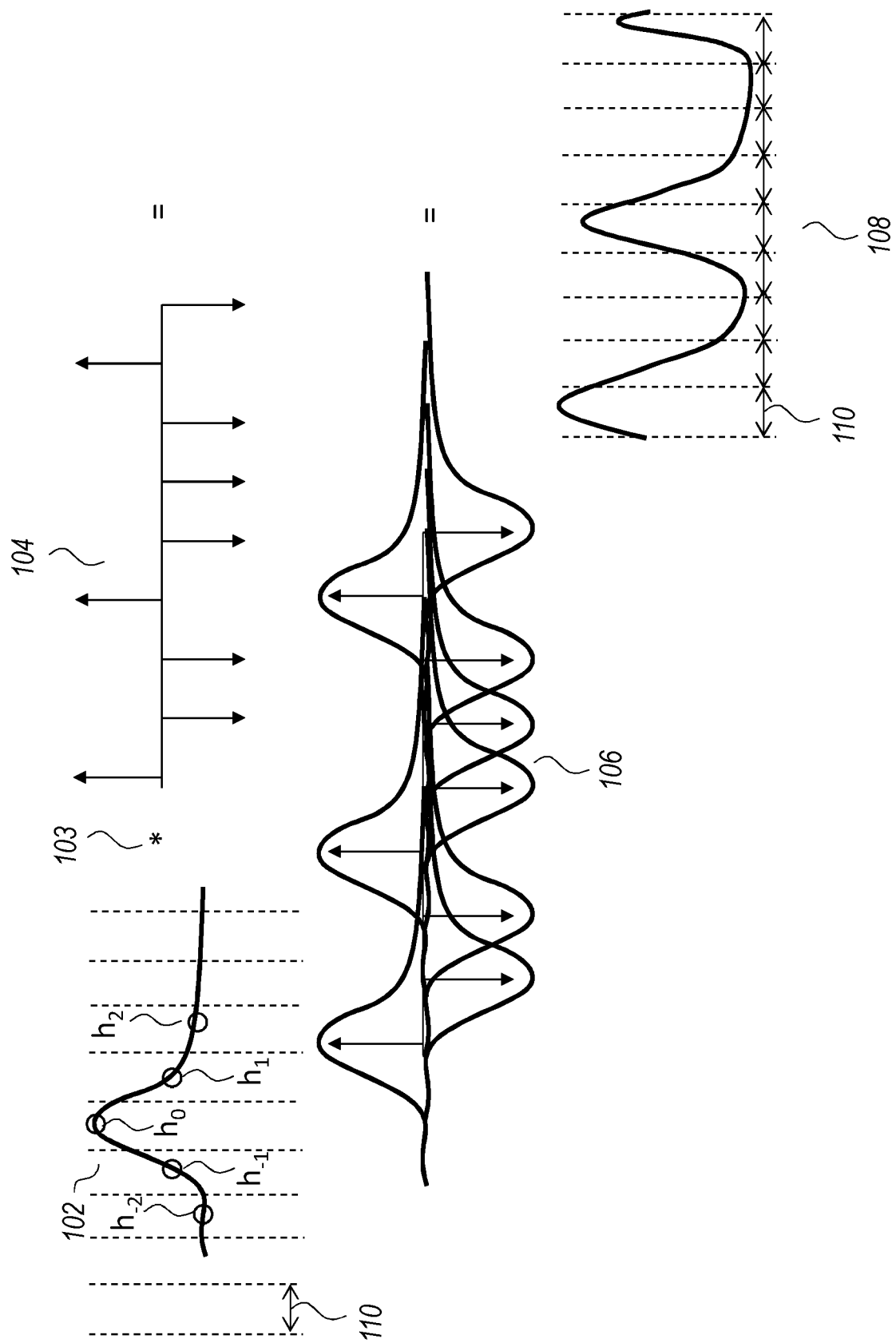
FIG. 1 shows a hypothetical channel output signal for an input to a receiver.

According to one aspect, embodiments in the present disclosure relate to techniques for measuring a value of pulse response cursors.

The adaptation of a cursor (e.g., a pulse response during a unit interval (UI)) to a target amplitude may be performed by making the "median" error null with respect to the target amplitude. For example, for the main cursor ($h_0$) to be equal to a target amplitude, a threshold may be set to the target amplitude. Then, the gain may be adapted until the "median" error is null, by correlating the error with a particular bit position. Here, the median of a set of samples refers to a point that divides the number of samples in two sets of equal count.

It may be of interest to know the magnitude of a particular pulse response cursor without correcting it. This could serve, for example, to measure the value of this cursor at the end of an equalization adaptation, and then try to maintain this value in a subsequent maintenance phase. This could also be used to derive optimal equalization object values from the value of this cursor. Therefore, a method to measure cursors without correcting them is useful for both having a target to set or to run more complicated adaptation schemes.

More particularly, measurement of an amplitude of a cursor while adapting DFE taps can improve the performance of the equalization adaptation for the following reasons.

First, when adapting a cursor in a receiver in a communication system, amplitudes of cursors as a result of measurement, i.e., measurements according to embodiments of the present disclosure, can be used as metrics to assess the quality of each equalization object (e.g., adapted cursors). Although DFE taps are strongly bound to a specified pulse response cursor, changing the sampling instant may affect the quality of the equalization even if the DFE taps are re-adapted to optimal values after the sampling instant shift. In this case, magnitudes of a pre-cursor as a result of measurement could be used to assess the quality of a specific equalization object (e.g., sampling instant) and set it based on the assessment. The equalization objects could be adjusted using measurements of post-cursors after the DFE correction. Measurements of post-cursors could be used to adjust the tail of an infinite response DFE or linear equalizer.

Second, amplitudes of cursors as a result of measurement can be used as metrics to maintain the equalization objects. For example, in order to prevent drifts in the sampling instant as environmental conditions evolve (temperature, voltage, aging, etc.), the pre-cursor ($h_{-1}$) can be measured after the initial adaptation so as to maintain an optimal timing shift for sampling the signal and errors used to drive the adaptation of other equalization objects.

Third, if the input pattern provided for adapting the DFE taps contains data correlations, the adaptation result could be affected. If the data contains correlations, the target amplitude may be shifted. Measurement of uncorrected cursors can be used to correct such pattern correlations while adapting a DFE and its gain. For example, to correct such pattern correlations, a pre-cursor (e.g., $h_{-1}$) is measured and a threshold is set based on the measured pre-cursor (e.g., the threshold is set to $h_0 + h_{-1}$); and then the cursors can be adapted by nulling the average error signal correlated with the current bit at each DFE tap distance.

Fourth, pulse response cursors may be measured by sending special lone-bit patterns. However, this method is not practical for adaptation with a frequency-rich data set, because communication protocols are not required to send lone-bit patterns during the link adaptation phase. Measurement of an amplitude of a cursor while adapting cursors without requiring communication protocols to send lone-bit patterns during the link adaptation phases is desirable.

Therefore, to provide metrics and correct such pattern correlations while adapting cursors, there is a need to measure an amplitude of a cursor. To solve this problem, some embodiments of the present disclosure provide a receiver device for receiving an input signal from a transmitter and measuring values of pulse response cursors in the input signal. The receiver device may include first circuitry and memory. The first circuitry may be configured to convert the input signal into a data signal that includes data symbols transmitted in successive unit intervals (UIs), determine a first threshold associated with a first symbol type, adjust a gain of the receiver device such that an average amplitude of data signal samples, when receiving data symbols having the first symbol type, corresponds to the first threshold, determine a second threshold that corresponds to an average amplitude of data signal samples when data symbols of a current UI have the first symbol type and data symbols of a first UI, at a first determined time distance from the current UI, have a second symbol type, and compute, as a first cursor value associated with the first UI, a first difference between the first threshold and the second threshold, multiplied by a first constant.

According to another aspect, embodiments in the present disclosure relate to techniques for adapting cursors to a non-zero value which may be a value previously measured.

The traditional procedure can adapt the equalization objects (for example, DFE taps, transmitter feed-forward equalization (TX FFE) taps or continuous time linear equalization (CTLE) pole-zero locations) until the corresponding pulse response cursor ($h_N$) is nulled. As the baud rate increases, it is not desirable to adapt all equalization objects to zero, because although this procedure may optimize the vertical eye opening, it may reduce the horizontal eye opening. Therefore, a method to adapt pulse response cursors other than the main cursor to a non-zero value is desirable.

To solve this problem, in some embodiments of the present disclosure, for non-return-to-zero (NRZ) input data, an adaptation process may involve the following steps: Step 1 through Step 5:

In Step 1, at a sampling instant within each bit period (e.g., unit interval, UI), corrected data signal may be compared to a null threshold to recover the current digital value (either "0" or "1").

In Step 2, at the same sampling instant, the corrected data signal may be compared with two thresholds: one with a positive threshold and one with a negative threshold. This may generate two digital error signals indicating whether the signal was above or below their respective thresholds at that sampling instant. In some embodiments of the present disclosure, in the traditional procedure, these thresholds are set to the magnitude of the main cursor ($h_0$). In some embodiments of the present disclosure, for adapting to a non-zero value, the thresholds may be set to a value different than $+-h_0$, for example, $(+h_0+h_N)$ or $(+h_0-h_N)$ or $(-h_0+h_N)$ or $(-h_0-h_N)$.

In Step 3, the error signal corresponding to the recovered digital value (e.g., positive for data=1, negative for data=0) may be then correlated with a recovered digital value taken a fixed integer amount of UI before or after the above-mentioned samples (i.e., the correlation target bit). This digital correlated error may indicate a trend as to whether a previous or past bit tends to reduce or increase the magnitude of the signal at a current bit. This trend may be generated due to the corresponding magnitude of the pulse response at the same distance from $h_0$ (for example., $h_{-N}$ for a pre-cursors bit, i.e., actuated by the type of a subsequent bit taken N-UIs after the current sample, or $h_{+N}$ for a post-cursor bit, i.e., actuated by the type of a previous bit taken N-UIs before the current sample). In some embodiments of the present disclosure, for adapting to a non-zero value, digital correlated errors may be further divided in two sets: (1) a first set related to when the current digital value (see step 1) is positively correlated with the target bit (see step 2), and (2) a second set when the current digital value is negatively correlated with the target bit.

In Step 4, the results of the digital correlated errors may be summed (or integrated) by an accumulator (e.g., the accumulator 416 in FIG. 4) over a large number of UIs to extract the average trend. In some embodiments of the present disclosure, for adapting to a non-zero value, the only one of the two sets (see step 3) may be summed and the other may be discarded.

In Step 5, when the accumulator reaches a target value (e.g., a minimum or maximum target value), the corresponding equalization parameter may be changed to reduce the trend in order to correct for the observed correlation. The accumulator may be reset and the process may be repeated, which eventually nulls the trend, within the quantification precision of the system.

In some embodiments of the present disclosure, for measuring a cursor, the thresholds (e.g., $(+h_0+h_N)$ or $(+h_0-h_N)$ or $(-h_0+h_N)$ or $(-h_0-h_N)$ of the step 2) may be changed instead of changing the corresponding equalization parameter. The measured cursor value may be a final value of $h_N$ after the loop converges. In some embodiments, cursors can be measured by changing a threshold and applying small changes to an adaptation logic.

In some embodiments, samples that do not correspond to selected correlation(s) and associated threshold(s) may be discarded. For example, a half of the samples may be discarded based upon the cursor being measured and the current bit. In some embodiments, the selected correlation(s) and associated threshold(s) may be changed sequentially, for example by going through all 4 combinations, i.e., $(+h_0+h_N)$, $(+h_0-h_N)$, $(-h_0+h_N)$, $(-h_0-h_N)$, in sequence, In some embodiments, thresholds can be switched between all 4 combinations, i.e., $(+h_0+h_N)$ or $(+h_0-h_N)$ or $(-h_0+h_N)$ or $(-h_0-h_N)$. In some embodiments, the final measured value may still include $h_0$, since there is no need to compute the difference if $h_0$ needs to be added back when using this measured value later, and that $h_0$ is not expected to change.

In some embodiments, equalization object parameters can be adapted such that pulse response cursors reach a non-zero target with a similar hardware to that used for pulse response cursor measurement. At this time, the equalization object may be adapted with modified error thresholds. In some embodiments, these thresholds can be ones previously measured. The measurement accuracy may be limited by the precision of $h_0$ or by the reference target.

In some embodiments, a step to refine the target (e.g., $h_0$ or $(+h_0+h_N)$ or $(+h_0-h_N)$ or $(-h_0+h_N)$ or $(-h_0-h_N)$) may be added, thereby obtaining a more precise measurement. In some embodiments, separate targets which would get rid of non-linearity altogether may be used. For example, (1) two separate non-linearity-insensitive target combination $(+h_0+h_N)$ and $(+h_0-h_N)$ may be used. For removal of non-linearity, (2) the combination $(+h_0-h_N)$, $(-h_0-h_N)$ or (3) the combination $(+h_0+h_N)$, $(-h_0+h_N)$ can also be used (one threshold towards the exterior of the eye, one threshold towards the interior of the eye). They are non-linearity insensitive but offset-sensitive. Alternatively, (4) the combination of two separate targets $(h_0-h_N)$ and $(-h_0+h_N)$ may be used. These combinations of targets are however offset-sensitive. There are thus four combinations (1)-(4), out of total 6 combinations.

In some embodiments, measuring the right combination of correlations and associated thresholds can partly annihilate the input offsets, thereby reducing the effect of input offsets. Offset-insensitive combinations will involve either both thresholds towards the inside of the eye, or both towards the outside: $(+h_0+h_N)$, $(-h_0-h_N)$ and $(+h_0-h_N)$, $(-h_0+h_N)$. For example, two separate targets $(+h_0+h_N)$ and $(-h_0-h_N)$ may be used. They are, however, non-linearity sensitive.

In some embodiments, the system measures a cursor first and adapts back to it later so that it is only the offset variation that will matter, even with offset-sensitive combinations. In some embodiments, the system could use offset information to adapt the offset at the same time, by accumulating the errors from two separate targets independently, and using the sum to control the cursor measurement and the difference to control the offset correction.

In some embodiments, the thresholds may be adapted instead of adapting the equalization object values. The adaptation of the thresholds instead of adapting the equalization object values has the following advantages. First. it can provide more resolution to the adaptation of objects, for example by adjusting the threshold in fine steps after a coarse input CTLE gain adjustment. Second, it can provide the ability to measure a pulse response cursor from monitoring data stream. Third, more optimal adaptations schemes can be devised, yielding better jitter tolerance, allowing lower-power designs and potentially reducing device area, verification cost and complexity. Fourth, cursor measurements can be performed with adaptation patterns and can then be used in conjunction with optimal adaptations to further improve performance. Fifth, it can provide the magnitude of a pulse response cursor without correcting it. This could serve, for example, to measure the value of this cursor at the end of an adaptation optimization, and then try to maintain this value in a subsequent maintenance phase. This could also be used to derive optimal equalization object values by setting adaptation parameters (e.g. thresholds) from the value of this cursor. Therefore, a method to measure cursors without correcting them is useful for both having a target to set or to run more complicated adaptation schemes.

In some embodiments, a combination of pulse response cursors can be measured by filtering the data accordingly. For example, a first symbol type is determined for a data samples gathered from a current UI, a second symbol type is determined for data signal samples gathered for a second UI and a third symbol type is determined for data samples gathered for a third UI. The cursor measured by adjusting the threshold until the accumulation of errors produced by the first, second and third symbol types is minimized will correspond to the sum of the cursors associated with the second and third symbol types, scaled according to the selected first, second and third symbol types. For example, if the first symbol type is '1', the second symbol type is '0' and the second UI is 2 UIs after the current UI, the third symbol type is '1' and the third UI is 1 UI after the current UI, then the threshold will converge to $h_0+h_{-1}-h_{-2}$, and thus $h_{-1}-h_{-2}$ can be measured directly by subtracting h0, for example by means of the threshold delta calculator 424. In some embodiments, arbitrary combinations of cursors could be computed.

In some embodiments, the measured pulse response cursors can be used to correct for correlations within the input data pattern. Correlations in the input pattern will change the value at which equalization objects will be adapted. For example, if the next UI is the same as the current UI for 60% of the time, the average of the data sample values for a given symbol type of the current bit value (e.g., current bit='1')

will be increased by 20% of the value of the pre-cursor $h_{-1}$ over its un-correlated value of $h_0$. Hence, any adaptation expecting to reach a target $h'_0$ (for example, a standard gain adaptation) will in fact reach a gain that brings the main cursor $h_0$ to reach $h'_0 - 20\% * h_{-1}$, since at this point the average (or mean, median or mode) of the data sample values will be $h'_0$. If the pre-cursor is previously measured and the correlations are known or measured, a corrected threshold can be set during the adaptation, e.g., $h'_0 = h_0 + 20\% * h_{-1}$.

In some embodiments, the correlations can be corrected by adapting equalization objects using a pattern filter such as the filter 412. In this case, the cursors that are expected to be correlated in the data pattern are explicitly correlated during the adaptation, and their value is measured using the methods described herein. For example, the filter 412 may only select to accumulate errors for cases where the current and next UIs are both '1'. The expected value is thus $h_0 + 100\% * h_{-1}$—in other words, the filter is making the correlation 100%. This prevents having to measure the correlation levels.

In another example, this method can be used for adapting DFE taps. For example, the first DFE tap is trying to null the pulse response $h_1$. When properly adapted, the first DFE tap subtract from the incoming data signal a value of $h_1$, scaled by −1 or +1 according to the previous bit being '0' or '1', respectively, what removes the effect of the previous bit over the current bit. The first DFE tap is adapted by adjusting its value until the average of the scaled errors reaches zero when the threshold is set to $h_0$. If the data pattern has some correlation between the current bit and the next bit, (e.g., 20%), then the DFE tap value will actually converge to $h_1 + 20\% * h_{-1}$. If $h_{-1}$ is measured, the threshold is set to $h_0 + h_{-1}$ and the scaled errors are only accumulated when the current and the next bits are both '1' (making the correlation with $h_{-1}$ 100%), the DFE tap will converge to the expected value of $h_1$.

Correlations in the data pattern may also affect the measurement of the cursors by means of adjusting the threshold, as described herein. However, as equalization object values converge and bring the corresponding corrected pulse response cursors to zero, the biases of the average of the data sample values incurred by input data correlations related to these corrected pulse response cursors are reduced, until they become negligible. So, measurement of pulse response cursors by methods described herein, in the presence of input data correlations, are most effective when other significant cursors are concurrently corrected (e.g., by a DFE) so as to reduce their amplitude. Pattern filters that ensure that the errors being accumulated by the Accumulator 416 come from an uncorrelated input data pattern subset (except for the bits being explicitly correlated by the filter 412) can further be used to remove the bias introduced by input data correlations.

Hereinafter, embodiments will be described with reference to the drawings.

FIG. 1 shows a hypothetical channel output signal 108 for an input to a receiver. Data signals can be voltage or current signals, but for discussion purposes, assume that data are transmitted using voltages. The signal 108 is supposed to carry a bit train 104 of logical values (i.e., "1" or "0") each convolved 103 with a single channel pulse response 102. The output pulse response 102 may be divided into a plurality of unit (time) intervals (UIs) 110 in duration. The single channel pulse response 102 may spread out beyond a time interval corresponding to a main cursor of the pulse response, spreading into a pre-cursor region and a post-cursor region. The main cursor region includes a main cursor $h_0$, the pre-cursor region includes a first pre-cursor $h_{-1}$ and a second pre-cursor $h_{-2}$, and the post-cursor region includes two post-cursors $h_1$ and $h_2$. These samples are 1 UI apart from each other, and each sample corresponds to an individual data symbol. The output signal 108 is severely distorted due to inter-symbol interference (ISI) by scaling, shifting and summing the convolved signals 106. As a result, the output signal 108 has peaks at different locations from that of the bit train 104. The output signal 108 may be divided into a plurality of unit (time) intervals (UIs) 110 in length.

Figure 2:
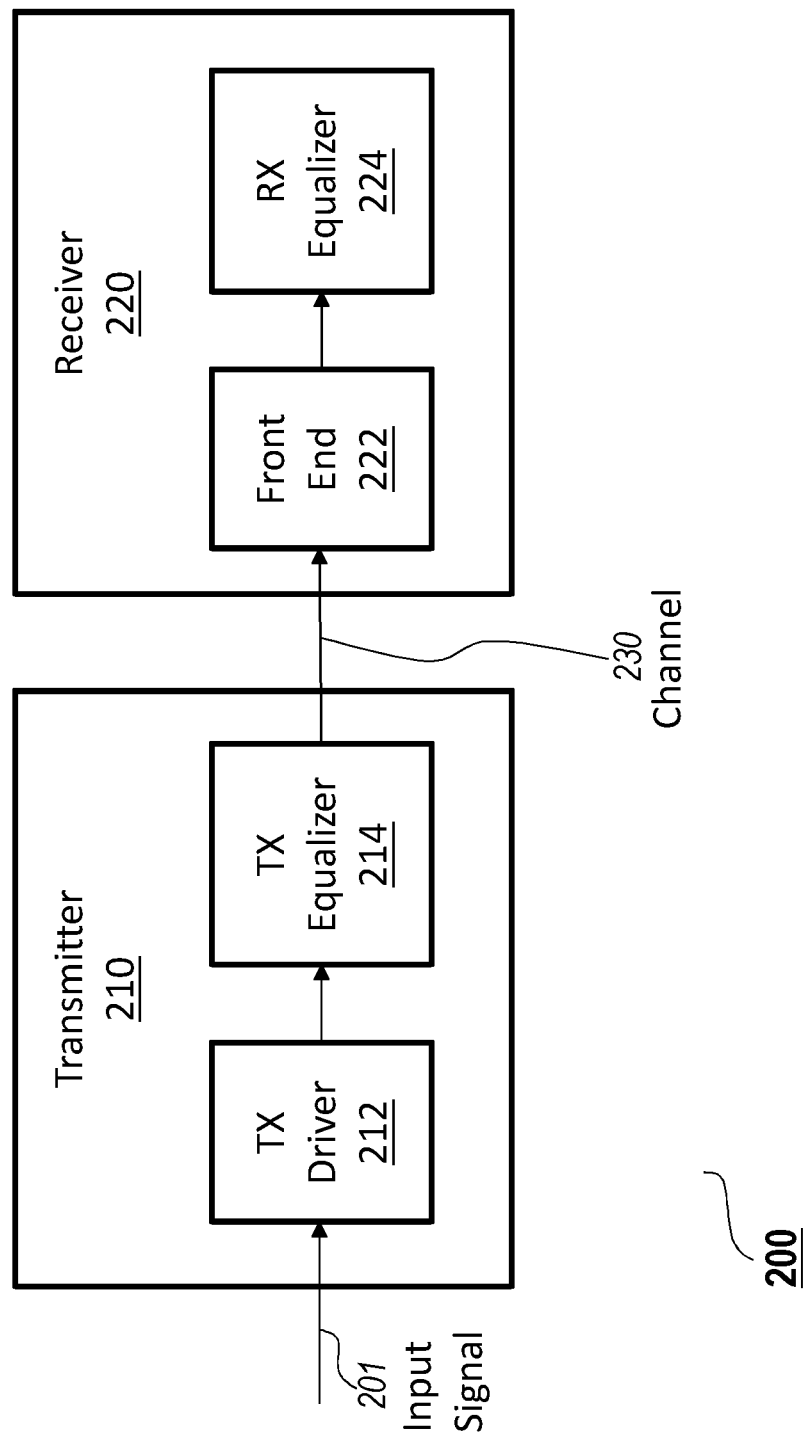
FIG. 2 is a block diagram illustrating a communication system according to some embodiments.

FIG. 2 is a block diagram of a communication system 200 according to an embodiment of the present disclosure. The system 200 may include a transmitter 210, a receiver 220, and at least one channel 230 connecting the transmitter to the receiver. The channel 230 may be unidirectional or bidirectional. Each channel may transmit data differentially using a positive polarity data signal and a negative polarity data signal. However, a single-ended implementation is also possible.

The transmitter 210 receives an input signal to be transmitted and transmits a representation of the input signal using a transmission (TX) driver 212. The system 200 may be a serial communication system, in which case the input signal may be serialized before or after being input to the transmitter. The TX driver may form a differential signal based on the input signal. The differential signal may have a specified amplitude, the value of which may vary depending on the communication standard by which the transmitter communicates with the receiver.

The transmitter 210 may include a TX equalizer 214, which could be implemented, for example using a feed-forward equalizer (FFE) having adjustable tap weights. The FFE may include multiple tap positions, one of which may be assigned to the pre-cursor position in an impulse response of the FFE. the remaining ones being allocated to positions associated with the main cursor and the post-cursor. In some embodiments, the TX equalizer 214 and the TX driver 212 can be combined into a single circuit block.

The input to the receiver 220 may be processed through a front end 222, which may include an AC coupling network, linear equalizer with programmable gain and/or frequency shaping, a sampler, and a deserializer. The front end 222 may pass the processed input to a receive (RX) equalizer 224. For example, the RX equalizer 224 may analyze the input to adjust the tap weight assigned to the pre-cursor position by sending a tap control signal to the TX equalizer 214 in the transmitter. The RX equalizer 224 may be part of the same circuit that controls the other taps of the TX equalizer 214. Alternatively, the RX equalizer 224 may be a separate control circuit. For simplicity, the elements for controlling the other taps have been omitted. The RX equalizer may also process the signal ahead of the sampler.

The RX equalizer 224 may perform additional signal conditioning, for example using a decision feedback equalizer (DFE) to correct the post-cursor of the input signal. RX equalizer 224 may also include other conventional receiver components, such as a timing recovery unit that corrects the timing of a sampler and/or a deserializer.

Figure 3:
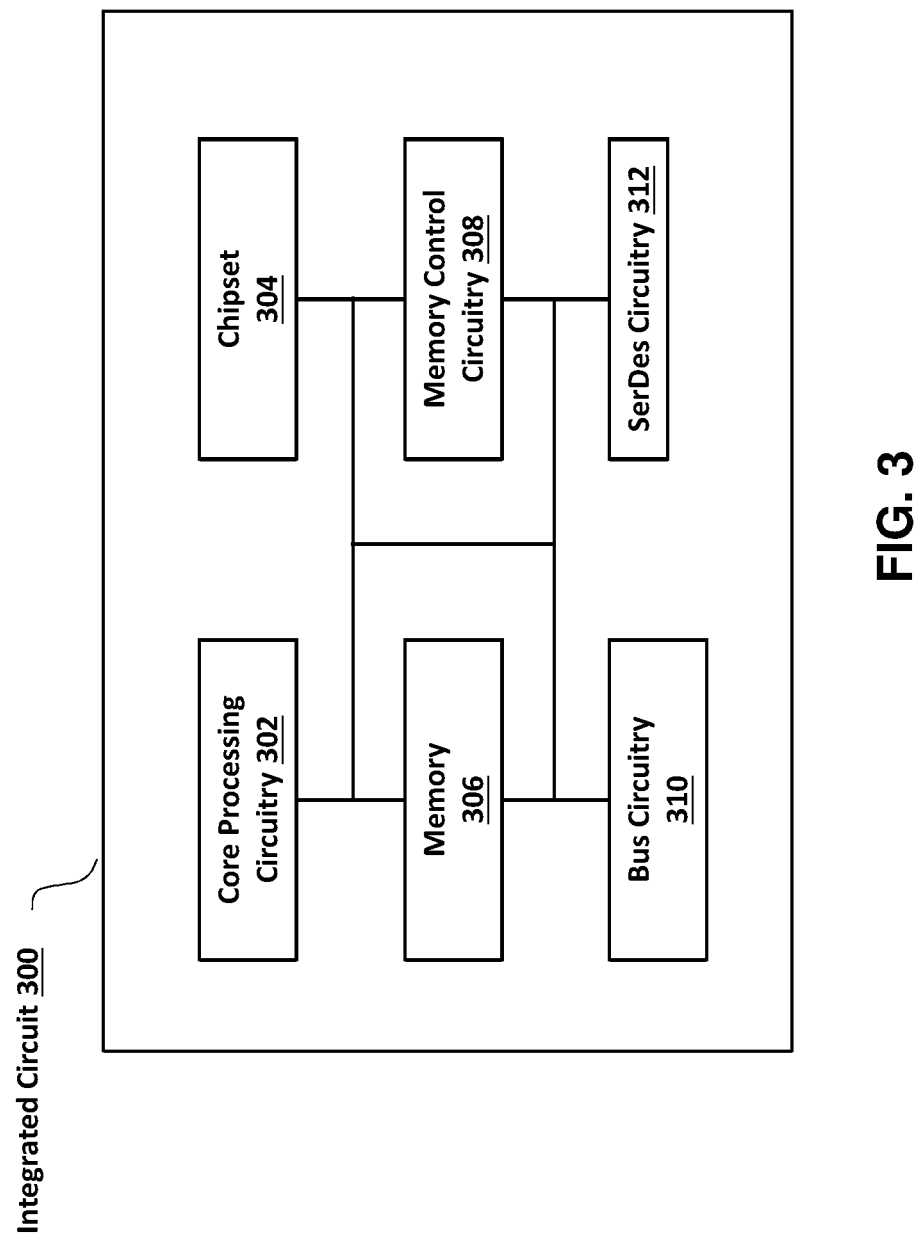
FIG. 3 is a block diagram of an integrated circuit (IC) according to some embodiments.

In some embodiments, the transmitter 210 and the receiver 220 may be implemented in one or more integrated circuits (ICs), for example, an IC illustrated in FIG. 3.

FIG. 3 is a block diagram of an integrated circuit (IC) according to an embodiment of the present disclosure. The term "integrated circuit", as used in any embodiment herein, may refer to a semiconductor device and/or microelectronic device, such as, for example, but not limited to, a semiconductor integrated circuit chip. The specific configuration, arrangement, and components shown in an IC 300 are provided merely for exemplary purposes as additional and/or alternative configurations are also within the scope of the present disclosure.

In some embodiments, the IC 300 may include core processing circuitry 302, which may include any suitable processors, e.g., an Intel® Pentium® processor or an Intel® Core™ processor. Of course, many other processors may be used without departing from the scope of the present disclosure. The IC 300 may also include chipset 304. In some embodiments, the chipset 304 may include both Northbridge/memory controller hub (MCH) and Southbridge/I/O controller hub (ICH) circuitry. These components may be included within the chipset 304 or at any other location within the IC 300. The IC 300 may also include memory 306, which may be in communication with core processing circuitry 302. Memory 306 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory may comprise other and/or later-developed types of computer-readable memory. The IC 300 may additionally include memory controller circuitry 308 configured to manage the flow of data to and from memory. The IC 300 may further include bus circuitry 310 configured to provide compatibility with a variety of different bus architectures, including, but not limited to, Universal Serial Bus (USB), Serial Advanced Technology Attachment (SATA), Peripheral Component Interface (PCI), PCI-Express and System Management Bus (SMBus). The IC 300 may also include SerDes circuitry 312, which may include numerous components configured to transceive one or more high-speed data streams.

Figure 4:
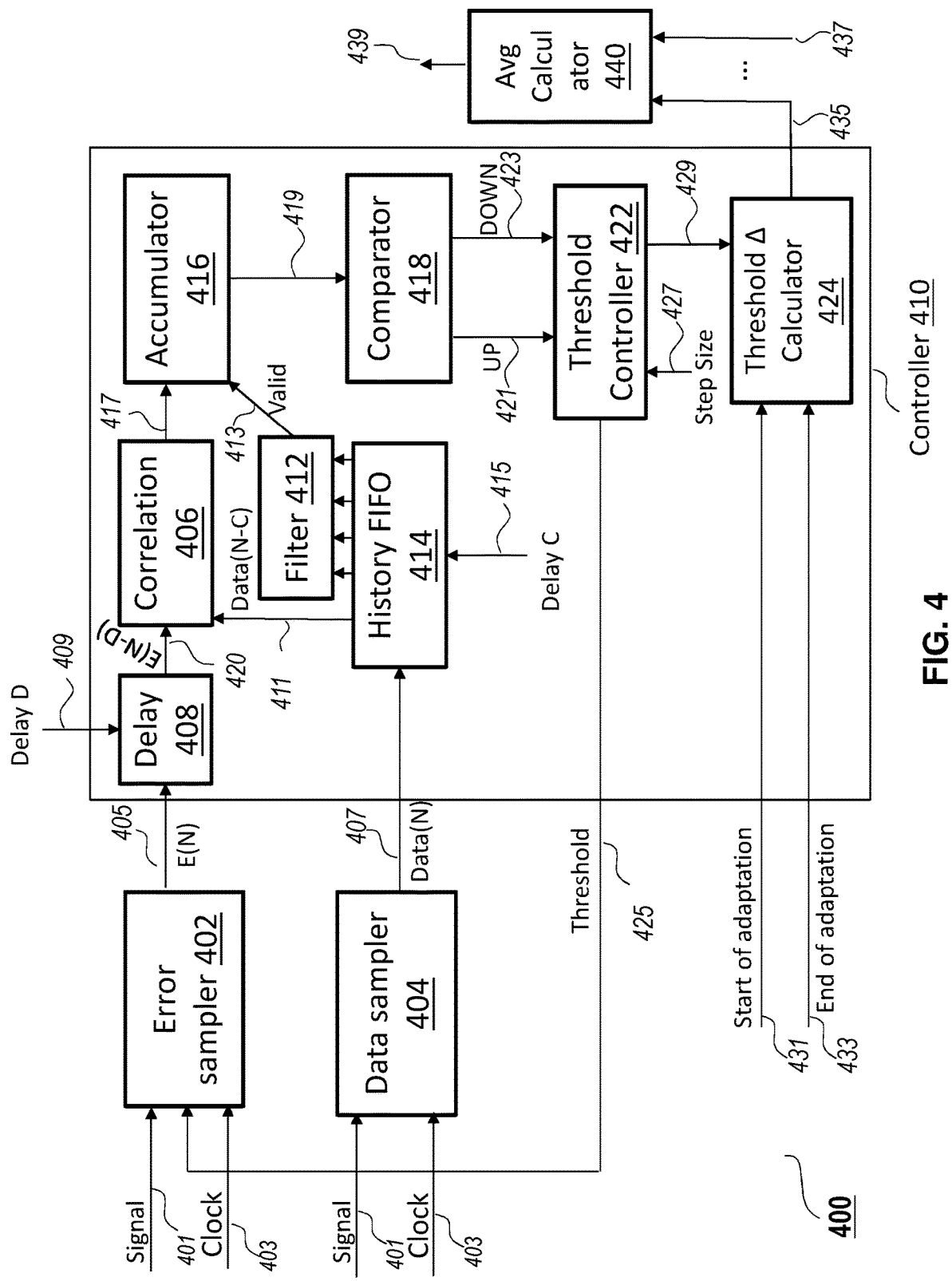
FIG. 4 is a block diagram illustrating a partial receiver according to some embodiments.

FIG. 4 is a block diagram of a partial receiver 400 according to an embodiment of the present disclosure. The partial receiver 400 may be implemented in a front end (e.g., the front end 222 in FIG. 2) or a RX equalizer (e.g., the RX equalizer 223 in FIG. 2) of a receiver (e.g., the receiver 220 in FIG. 2). The partial receiver 400 may include an error sampler 402, a data sampler 404, a controller 410, and/or an average calculator 440. In some embodiments, the error sampler 402, data sampler 404, and controller 410 may be implemented in one or more integrated circuits (ICs), for example, the IC illustrated in FIG. 3.

Referring to FIG. 4, in some embodiments, the error sampler 402 may convert a received input signal 401 into an error signal 405 representing an error sample E(N) measured for the same UI (N) as the corresponding data sample Data(N). The error sampler 402 may include analog-to-digital conversion elements such as comparators, voltage reference generators, memory latches, shift registers, etc. The error signal 405 may represent the difference between the input signal 401 and a threshold value 425 generated by a threshold controller 422. The samples for the error signal 405 may be taken at time intervals controlled by a clock signal 403.

In some embodiments, the data sampler 404 may convert a received input signal 401 into a data signal 407. The data sampler 402 may include analog-to-digital conversion elements such as comparators, voltage reference generators, memory latches, shift registers, etc. The data signal 407 may represent digital 1's and 0's to form a stream of digital pulses Data(N). The samples for the data signal 407 may be taken at time intervals controlled by the clock signal 403.

In some embodiments, the controller 410 may include a delay generator 408, a history first-in-first-out (FIFO) queue 414, a filter 412, a correlation calculator 406, an accumulator 416, a comparator 418, a threshold controller 422, and/or a threshold delta calculator 424.

In some embodiments, the delay generator 408 may delay the error signal relative to the data signal so that an error sample is correlated with a data sample positioned earlier in time. For example, the delay generator 408 may receive an error sample E(N) (from the error sampler 402) and an UI amount D indicated by a signal 409 to generate a delayed error signal E(N-D) delayed by D UIs relative to the data signal Data(N).

In some embodiments, the history FIFO queue 414 may store, as history data, earlier and later samples of the data signal 407 relative to the cursor C which is represented by a signal 415. The output of the history FIFO queue 414 may include (1) the sampled data signal (Data(N)) delayed by C UIs (e.g., Data(N-C) 411) to be output to the correlation calculator 406 and (2) a number of data bits to be output to the filter 412.

In some embodiments, the correlation calculator 406 may correlate the error sample E(N-D), which is represented by the signal 420, with the data sample Data(N-C) inputted from the history FIFO queue 414. In some embodiments, the correlation can be performed using a least mean squares (LMS) algorithm. The output of the correlation calculator 406 may be a signal 417 to be output to the accumulator 416, representing a result of the correlation between the current error sample and each of multiple pre-cursors bits.

Pre-cursor bits, i.e., bits received earlier than a reference sample, will impact the reference bit amplitude in proportion of the magnitude of corresponding post-cursors of the pulse response (i.e., $h_N$, where N>0). Conversely, post-cursor bits, i.e., bits received later than a reference sample, will impact the reference bit amplitude in proportion of the magnitude of corresponding pre-cursors of the pulse response (i.e., $h_N$, where N<0). In some embodiments, the delay block 408 makes it possible to correlate both pre and post-cursors.

In some embodiments, the filter 412 may perform pattern detection logic to look for a particular pattern (e.g., four consecutive identical data bits (all 0's or all 1's) prior to a current data sample) in the number of data bits outputted by the FIFO queue 414. If the particular pattern is detected, the filter 412 may output to the accumulator 416 a signal 413 representing that the correlation result using the currently stored bits is valid. Otherwise if the particular pattern is not detected, the filter 412 may output to the accumulator 416 a signal 413 representing that the correlation result using the currently stored bits is not valid, so that the accumulator 416 will not accumulate the current correlation result. In some embodiments, the filter 412 may be bypassed so that the accumulator 416 use all the correlation results that are obtained from data samples.

In some embodiments, the accumulator 416 may sum the correlation results from the correlation calculator 406 and output a result of the summation as a trend value 419 to the comparator 418. In some embodiments, the accumulator 416 may accumulate a sign of the correlation results from the correlation calculator 406 and output an accumulated sign as a result of the accumulation. For example, when the number of positive correlation results is greater than the number of negative correlation results, the accumulator 416 may output a positive value (e.g., a positive difference between two numbers); when the number of positive correlation results is smaller than the number of negative correlation results, the accumulator 416 may output a negative value (e.g., a negative difference between two numbers); and when the two numbers are the same as each other, the accumulator 416 may output "0". In some embodiments, the comparator 418 may compare the trend value with a predetermined target trend value and determine, based on a result of the comparison, whether the trend value is greater than the predetermined target trend value. If it is determined that the trend value is greater than the predetermined target trend value, the comparator 418 may output an UP signal 421 instructing the threshold controller 422 to increase the threshold value 425. On the other hand, if it is determined that the trend value is smaller than the predetermined target trend value, the comparator 418 may output a DOWN signal 421 instructing the threshold controller 422 to decrease the threshold value 425. In some embodiments, if it is determined that the trend value is equal to the predetermined target trend value, the comparator 418 may output both the UP signal 421 and the DOWN signal 423. In some embodiments, if it is determined that the trend value is equal to the predetermined target trend value, the comparator 418 may output a null value for both the UP signal 421 and the DOWN signal 423.

In some embodiments, in response to receiving the UP signal 421, the threshold controller 422 may increase the threshold value by a step size indicated by a signal 427 and output the increased threshold value 425 to the error sampler 402. In response to receiving the DOWN signal 423, the threshold controller 422 may decrease the threshold value 425 by the step size indicated by a signal 427 and output the decreased threshold value 425 to the error sampler 402. In some embodiments, in response to receiving both the UP signal 421 and the DOWN signal 423 (or receiving a null value for both the UP signal and the DOWN signal), the threshold controller 422 may output a current threshold value 429, which is equal to the current threshold value 425, to the threshold delta calculator 424.

The threshold delta calculator 424 may be configured to compute a variation or difference in threshold and output a signal 435 representing the computed threshold variation or difference. The threshold delta calculator 424 may receive a start signal 431 and a stop signal 433 as input signals, which indicate when the adaptation starts and when it is assumed to be finished, respectively. The threshold delta calculator 424 may capture a first threshold value (represented by the value 429) at the start (when the start signal 431 is received) and a second threshold value (represented by the value 429) at the end (when the end signal 433 is received), and calculate the difference between the first and second threshold values, and then output the difference as an output signal 435 which indicates a measured cursor value. In some embodiments, the output signal 435 may be input to the average calculator 440 so that the measured cursor value represented by the output signal 435 and another measured cursor value represented by an output signal 437 can be averaged to output a signal 439 representing an average of the two measured cursor values.

In some embodiments, the delay C may be initially set to the delay D and the threshold controller 422 may output the current threshold value 429 based on correlation between the error sample E(N) and D(N), corresponding to the comparison of the main cursor with the current threshold. Then, after some time, the start signal 431 may be generated to cause the threshold delta calculator 424 to capture the current threshold value, corresponding to $h_O$. Subsequently, the delays C and D may be set to accumulate correlations for a specific cursor ($h_N$, N=C−D) other than the main cursor ($h_O$) and the threshold controller 422 may output the current threshold value 429 based on correlation between the error sample for the specific cursor and each of multiple pre-cursors bits. Then, the end signal 433 may be generated to cause the threshold delta calculator 424 to capture the current threshold value and output the difference between the captured threshold values as a measured cursor value for the specific cursor ($h_N$).

Figure 5A:
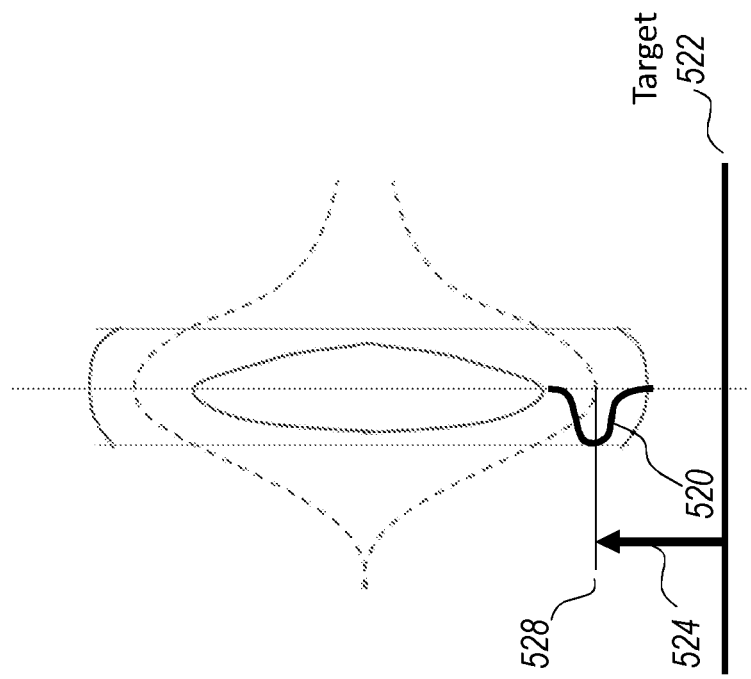
FIG. 5(a) and FIG. 5(b) are eye diagrams illustrating an example aspect of adapting a main cursor according to some embodiments.

FIG. 5(a) to FIG. 11(b) show eye diagrams according to some embodiments of the present disclosure. In FIG. 5(a) to FIG. 11(b), the dashed lines (e.g., the line 512 in FIG. 5(a) represent the system's pulse response, overlaid over the 1-UI wide eye diagram that represents inner and outer eye limits.

Figure 5B:
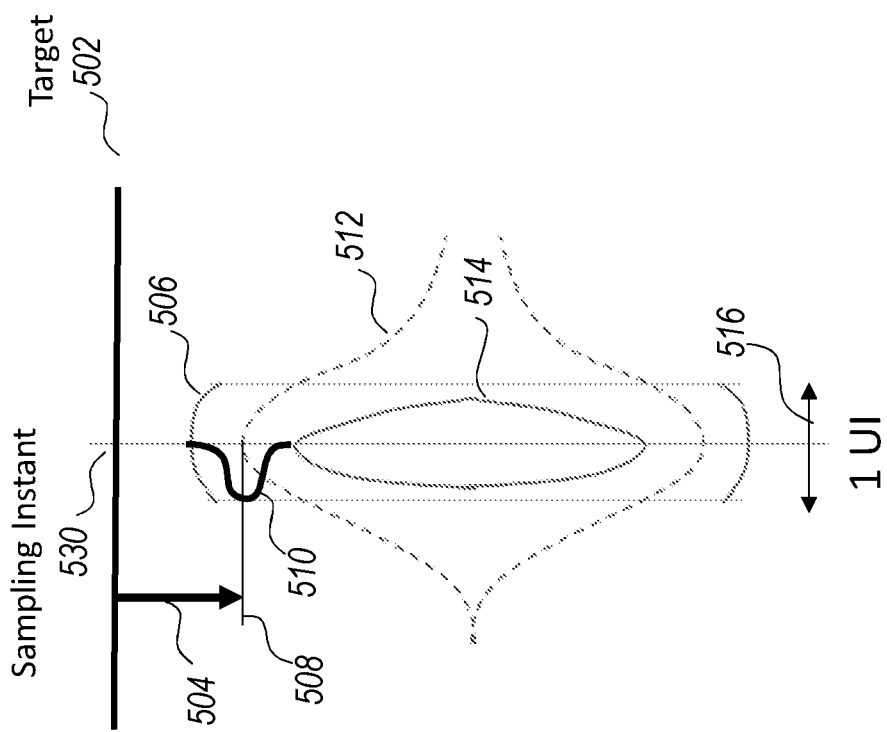

FIG. 5(a) and FIG. 5(b) are eye diagrams illustrating an example aspect of adapting a main cursor $h_O$ that is sampled from an original pulse response 512 in an UI 516. In the eye diagram of FIG. 5(a), an eye contour 514 may be computed by subtracting from the original pulse response 512 the absolute magnitude of a pulse response (N×1) UI away (for N=−∞ to +∞, excluding N=0). An eye contour 506 may be computed by adding to the original pulse response 512 the absolute magnitude of a pulse response (N×1) UI away (for N=−∞ to +∞, excluding N=0).

Referring to FIG. 5(a), when input data is '1', the main cursor $h_O$ may be adapted by setting a threshold to a desired target value 502. An error 504 can be obtained by comparing the data sample at the sampling instant (vertical line in the middle of the eye 530) with the threshold (which is set to the target value 502). In some embodiments, gain can be adapted such that a median of the errors ("error median") is null. In other words, gain can be adapted such that an adapted value of the main cursor $h_O$ (508) becomes equal to the target value. A probability density function (PDF) 510 of the errors can be defined such that an adapted value 508 of the main cursor $h_O$ may split the PDF 510 into two equiprobable halves. In other words, the adapted value 508 of the main cursor $h_O$ may correspond to a median amplitude of data signal samples. In some embodiments, the adapted value 508 of the main cursor $h_O$ may correspond to an average (or mean, median or mode) amplitude of the data signal samples.

An adaptation similar to that of FIG. 5(a) can be performed on the other side, i.e., when input data is '0', as shown in FIG. 5(b). In some embodiments, the adaptation of FIG. 5(b) may be omitted. Referring to FIG. 5(b), when input data is '0', a main cursor $h_O$ may be adapted by setting a threshold to a desired target value 522. An error 524 can be obtained by comparing the main cursor $h_O$ with the threshold (which is set to the target value 522). In some embodiments, gain can be adapted such that a median of the errors ("error median") is null. In other words, gain can be adapted such that an adapted value of the main cursor $h_O$ is equal to the target value. A probability density function (PDF) 520 of the errors can be defined such that an adapted value 528 of the main cursor $h_O$ may split the PDF 520 into two equiprobable halves. In other words, the adapted value 528 of the main cursor $h_O$ may correspond to a median amplitude of the data signal samples. In some embodiments, the adapted value 528 of the main cursor $h_O$ may correspond to an average (or mean, median or mode) amplitude of the data signal samples.

FIG. 6(a), FIG. 6(b) and FIG. 6(c) are eye diagrams illustrating an example aspect of adapting the main cursor $h_O$ when input data is '1'. In some embodiments, when input data is '1', adaptation may be performed in a positive side of the eye diagram, i.e., above a line 604 indicating a zero amplitude. As shown in FIG. 6(a), FIG. 6(b) and FIG. 6(c), a threshold may be set to a desired target value 602. FIG. 6(a) shows a case in which distribution of errors (e.g., difference between the pre-cursors and the threshold) follows a PDF 612. Because an average 610 (or mean, median or mode) of the PDF 612 is smaller than the target value 602, it may be determined that gain is lower than an optimal gain. In response to the determination that gain is lower than an optimal gain, the main cursor $h_0$ may be adapted to be increased (as shown in FIG. 6(b)). On the other hand, FIG. 6(c) shows a case in which distribution of errors follows a PDF 632. Because an average 630 (or mean, median or mode) of the PDF 632 is greater than the target value 602, it may be determined that gain is higher than the optimal gain. In response to the determination that gain is higher than the optimal gain, the main cursor $h_0$ may be adapted to be decreased (as shown in FIG. 6(b)). FIG. 6(b) shows a case in which distribution of errors follows a PDF 622. Because an average 620 (or mean, median or mode) of the PDF 622 is equal to the target value 602, it may be determined that gain is optimal, i.e., equal to the optimal gain.

FIG. 7(a), FIG. 7(b) and FIG. 7(c) are eye diagrams illustrating an example aspect of measuring a main cursor $h_0$ when input data is '1'. In some embodiments, when input data is '1', measurement may be performed in a positive side of the eye diagram, i.e., above a line 704 indicating a zero amplitude. As shown in FIG. 7(a), FIG. 7(b) and FIG. 7(c), a threshold (represented by a line 702) may be initially set to a desired target value.

FIG. 7(a) shows a case in which distribution of errors (e.g., difference between signal samples and a value of the current threshold) follows a PDF 712. In some embodiments, before calculating the PDF 712, the target cursor is set to the main cursor $h_0$ (e.g., by setting the delay C in FIG. 4 equal to the delay D). Subsequently, in some embodiments, the PDF 712 representing distribution of errors (e.g., difference between signal at the sampling instant and a value of the current threshold) may be calculated by a correlation calculator (e.g., the correlation calculator 406 in FIG. 4). In some embodiments, an average 714 (or mean, median or mode) of the PDF 712 may be calculated by an accumulator (e.g., the accumulator 416 in FIG. 4). The pattern filter is bypassed in this case. Because the current threshold value 702 is greater than the average 714 (or mean, median or mode) of the PDF 712, it may be determined that the value of the current threshold is too high. In some embodiments, the accumulator may accumulate, as an accumulated sign of error, i.e., an accumulated sign of a difference between the signal at the sampling instant and a value of the current threshold. For example, when the number of positive errors is greater than the number of negative errors, it is determined that the value of the current threshold is too low; when the number of positive errors is smaller than the number of negative errors, it is determined that the value of the current threshold is too high; and when the two numbers are the same as each other, it is determined that the value of the current threshold is the same as a measured value of the main cursor $h_0$. In some embodiments, the determination may be made by a comparator (e.g., the comparator 418 in FIG. 4) comparing the average 714 and the current threshold value 702. In some embodiments, in response to the determination that the value of the current threshold is too high, the current threshold value may be decreased (e.g., moved down in FIG. 7(a)-FIG. 7(c)) by a predetermined step size. For example, in response to the determination that the value of the current threshold is too high, a controller of a receiver (e.g., the controller 410 in FIG. 4) may decrease the current threshold value (e.g., the value represented by the threshold signal 425 in FIG. 4) by a predetermined step size (e.g., the step size represented by the signal 427 in FIG. 4). In some embodiments, a controller of a receiver may calculate the sum of correlation between an error sample and a plurality of previous or future bits, and determine, based on the calculated sum of correlation, whether the current threshold is too low or high. In some embodiments, it is determined whether the value of the current threshold is low or high by comparing the sum of correlation with a target value (e.g., a minimum correlation value or a maximum correlation value).

FIG. 7(c) shows a case in which distribution of errors (e.g., difference between signal samples and a value of the current threshold) follows a PDF 732. In some embodiments, before calculating the PDF 732, the target cursor is set to the main cursor $h_0$ (e.g., by setting the delay C in FIG. 4 equal to the delay D). Subsequently, in some embodiments, the PDF 732 representing distribution of errors (e.g., difference between signal at the sampling instant and a value of the current threshold) may be calculated by a correlation calculator (e.g., the correlation calculator 406 in FIG. 4). In some embodiments, an average 734 (or mean, median or mode) of the PDF 712 may be calculated by an accumulator (e.g., the accumulator 416 in FIG. 4). The pattern filter is bypassed in this case. Because the current threshold value 702 is smaller than the average of the PDF 732, it may be determined that the value of the current threshold is too low. In some embodiments, the determination may be made by a comparator (e.g., the comparator 418 in FIG. 4) comparing the average 734 and the current threshold value 702. In some embodiments, in response to the determination that the value of the current threshold is too low, the current threshold value may be increased (e.g., moved up in FIG. 7(a)-FIG. 7(c)) by a predetermined step size. For example, in response to the determination that the value of the current threshold is too low, a controller of a receiver (e.g., the controller 410 in FIG. 4) may increase the current threshold value (e.g., the value represented by the threshold signal 425 in FIG. 4) by a predetermined step size (e.g., the step size represented by the signal 427 in FIG. 4).

FIG. 7(b) shows a case in which distribution of errors (e.g., difference between signal samples and a value of the current threshold, for a pre-determined type of digital data) follows a PDF 722. Because the current threshold value 702 is equal to an average 724 (or mean, median or mode) of the PDF 712, it may be determined that the value of the current threshold is the same as a measured value of the main cursor $h_0$. In some embodiments, in response to the determination that the value of the current threshold is the same as a measured value of the main cursor $h_0$, the current threshold value may be output as a measured value of the main cursor. For example, in response to the determination that the value of the current threshold is the same as a measured value of the main cursor $h_0$, the current threshold value (e.g., the value represented by the threshold signal 429 in FIG. 4) may be output as a measured value of the main cursor by the controller of the receiver (e.g., the controller 410 in FIG. 4).

FIG. 8(a), FIG. 8(b), FIG. 8(c) and FIG. 8(d) are eye diagrams illustrating an example aspect of adapting a cursor other than the main cursor $h_0$ (e.g., adapting a pre-cursor $h_{-1}$). In some embodiments, to adapt a cursor $h_N$ (which may be a pre-cursor or a post-cursor), a threshold may be set to a desired target value of $+h'_N$ or $-h'_N$ (depending on the current bit value of N-UIs before the current bit, as selected by a pattern filter, such as 412; $+h'_N$ and $-h'_N$ are not shown in the drawings) and an average (e.g., mean, mode, or median) of a PDF of errors (e.g., difference between the signal amplitude at the sampling instant and the threshold) may be obtained. In some embodiments, the threshold may be set to a value of the main cursor $+h_0$ or $-h_0$ (depending on the current sampled bit value, as selected by the pattern filter, such as 412), plus or minus the desired cursor value $h'_N$. The average of the PDF of errors may be compared with the threshold to determine whether the actual cursor value $h_N$ is high or low. For example, if a bit value at the current sampling instant is '1' and a bit value N-UIs before the current sampling instant is also '1', the threshold may be set to $+h_0+h_1$ and the average (or mean, median or mode) of a PDF of errors is obtained The average of the PDF may be then compared with the threshold. If the average of the PDF is greater than the threshold, it is determined that the cursor $h_N$ is too high; otherwise, if the average of the PDF is smaller than the threshold, it is determined that the cursor $h_N$ is too small. In some embodiments, if a desired target value of $h_N$ is zero (i.e., $h'_N=0$), the threshold may be set to $+h_0$ or $-h_0$, and the same error signal can be averaged for both values of the bit N-UIs before the current one. In this case, only the sign of the error can to be modified according to the correlation between the current data signal sample and the data signal sample N-UIs before, before it is averaged.

FIG. 8(a) and FIG. 8(b) show eye diagrams illustrating adapting a pre-cursor in a case in which the bit value of the current sample is '1' and a desired target value of is In the case where the current sampled bit value is '1', when the desired value for is zero, the threshold may be set to $h_0$ (802), and the average of the PDF of errors may be adapted such that it converges to this threshold value. In other words, the adaptation of to zero may be performed in a positive side (i.e., above the line 806) of the eye diagrams using a single threshold at $h_0$ (802). The sign of the accumulated errors may be modulated according to the value of the next bit, such that the sign of the variation due to the pre-cursor $h_{-1}$ is modulated (FIG. 8(a) vs. FIG. 8(b)). In some embodiments, the precise value for $h_0$, used to determine the threshold $h_0+h'_{-1}$ may have been measured previously as explained in FIG. 7.

FIG. 8(a) shows a case in which the bit value of the current bit is 1 (i.e., its effect on the current sample is $+h_0$) and the next bit value is '1', creating an effect on the current sample of $+h_{-1}$ (indicated by an arrow 812). To adapt the pre-cursor $h_{-1}$ to zero, the threshold may be set to a desired target value, e.g., $h_0$, in this case, and an average (e.g., mean, mode, or median) of a PDF of errors (e.g., difference between the data signal value at the sampling instant and the threshold) may be obtained. The effect of the pre-cursor $h_{-1}$ may be a positive increase in the value of the current bit amplitude when the next bit is 1, as indicated by an arrow 814. More generally, to adapt the pre-cursor $h_{-1}$ to $h'_{-1}$, the threshold may be set to a desired target value, e.g., $h_0+h'_{-1}$ in this case, and an average (e.g., mean, mode, or median) of a PDF of errors (e.g., difference between the data signal at the sampling instant and the threshold) may be obtained. As shown in FIG. 8(a), the average of the signal PDF is $h_0+h_{-1}$ for this bit pattern (represented by a line 816) which is to be adapted to the desired threshold $h_0+h'_{-1}$, until they become coincident. If the average of the error signal is positive, it is determined that the cursor $h_{-1}$ is too high, and in response to the determination that the cursor $h_{-1}$ is too high, the cursor $h_{-1}$ may be adapted to be decreased. Conversely, if the average of the error signal is negative, it is determined that the cursor $h_{-1}$ is too low, and in response to the determination that the cursor $h_{-1}$ is too low, the cursor $h_{-1}$ may be adapted to be increased.

FIG. 8(b) shows a case in which the bit value of the current bit is 1 (i.e., its effect on the current sample is $+h_0$) and the next bit value is '0', creating an effect on the current sample of $-h_{-1}$ (indicated by an arrow 822). To adapt the pre-cursor $h_{-1}$ to zero, the threshold may be set to a desired target value, e.g., $h_0$, in this case, and an average (e.g., mean, mode, or median) of a PDF of errors (e.g., difference between the data signal value at the sampling instant and the threshold) may be obtained. The effect of the pre-cursor $h_{-1}$ may be a negative increase in the value of the current bit amplitude when the next bit is 0, as indicated by an arrow 824. More generally, to adapt the pre-cursor $h_{-1}$ to $h'_{-1}$, the threshold may be set to a desired target value, e.g., $h_0-h'_{-1}$ in this case, and an average (e.g., mean, mode, or median) of a PDF of errors (e.g., difference between the data signal at the sampling instant and the threshold) may be obtained. As shown in FIG. 8(b), the average of the signal PDF is $h_0-h_1$ for this bit pattern (represented by a line 826) which is to be adapted to the desired threshold $h_0-h'_{-1}$, until they become coincident. In this case, if the average of the error signal is negative, it is determined that the cursor $h_{-1}$ is too high, and in response to the determination that the cursor $h_{-1}$ is too high, the cursor $h_{-1}$ may be adapted to be decreased.

FIG. 8(c) and FIG. 8(d) show eye diagrams illustrating adapting a pre-cursor $h_{-1}$ in a case in which the bit value of the current sample is '0' and a desired target value of $h'_{-1}$ is $h_{-1}$. In the case where the current sampled bit value is '0', when the desired value for $h_{-1}$ is zero, the threshold may be set to $-h_0$ (804), and the average of the PDF of errors may be adapted such that it converges to this threshold value. In other words, the adaptation of $h_{-1}$ to zero may be performed in a negative side (i.e., below the line 806) of the eye diagrams using a single threshold at $-h_0$ (804). In some embodiments, the precise value for $h_0$, used to determine the threshold $-h_0+h'_{-1}$ may have been measured previously as explained in FIG. 7.

FIG. 8(c) shows a case in which the bit value of the current bit is 0 (i.e., its effect on the current sample is $-h_0$) and the next bit value is '1', creating an effect on the current sample of $+h_{-1}$ (indicated by an arrow 832). To adapt the pre-cursor $h_{-1}$ to zero, the threshold may be set to a desired target value, e.g., $-h_0$, in this case, and an average (e.g., mean, mode, or median) of a PDF of errors (e.g., difference between the data signal value at the sampling instant and the threshold) may be obtained. The effect of the pre-cursor $h_{-1}$ may be a positive increase in the value of the current bit amplitude when the next bit is 1, as indicated by an arrow 834. More generally, to adapt the pre-cursor $h_{-1}$ to $h'_{-1}$, the threshold may be set to a desired target value, e.g., $-h_0+h'_{-1}$ in this case, and an average (e.g., mean, mode, or median) of a PDF of errors (e.g., difference between the data signal at the sampling instant and the threshold) may be obtained. As shown in FIG. 8(c), the average of the signal PDF is $-h_0+h_{-1}$ for this bit pattern (represented by a line 836) which is to be adapted to the desired threshold $-h_0+h'_{-1}$, until they become coincident. When the average of the error signal is positive, it is determined that the cursor $h_{-1}$ is too high, and in response to the determination that the cursor $h_{-1}$ is too high, the cursor $h_{-1}$ may be adapted to be decreased.

FIG. 8(d) shows a case in which the bit value of the current bit is 0 (i.e., its effect on the current sample is $-h_0$) and the next bit value is '0', creating an effect on the current sample of $-h_{-1}$ (indicated by an arrow 842). To adapt the pre-cursor $h_{-1}$ to zero, the threshold may be set to a desired target value, e.g., $-h_0$, in this case, and an average (e.g., mean, mode, or median) of a PDF of errors (e.g., difference between the data signal value at the sampling instant and the threshold) may be obtained. The effect of the pre-cursor $h_{-1}$ may be a negative increase in the value of the current bit amplitude when the next bit is 0, as indicated by an arrow 844. More generally, to adapt the pre-cursor to the threshold may be set to a desired target value, e.g., $-h_0-h'_{-1}$ in this case, and an average (e.g., mean, mode, or median) of a PDF of errors (e.g., difference between the data signal at the sampling instant and the threshold) may be obtained. As shown in FIG. 8(*d*), the average of the signal PDF is $-h_0-h_{-1}$ for this bit pattern (represented by a line 846) which is to be adapted to the desired threshold $-h_0-h'_{-1}$, until they become coincident. When the average of the error signal is negative, it is determined that the cursor $h_{-1}$ is too low, and in response to the determination that the cursor $h_{-1}$ is too low, the cursor $h_{-1}$ may be adapted to be increased.

FIG. 9(*a*), FIG. 9(*b*), FIG. 9(*c*) and FIG. 9(*d*) are eye diagrams illustrating an example aspect of measuring cursors other than the main cursor $h_0$ (e.g., measuring a pre-cursor $h_{-1}$). More particularly, FIG. 9(*a*), FIG. 9(*b*), FIG. 9(*c*) and FIG. 9(*d*) are eye diagrams illustrating measurement of a pre-cursor in four cases according to the combinations of the bit value of the main cursor $h_0$ (i.e., the current bit value '1' or '0') and the bit value of the pre-cursor (the next bit value '1' or '0').

Referring to FIG. 9(*a*) and FIG. 9(*h*), in some embodiments, when the current bit value is '1', measurement may be performed in a positive side of the eye diagram, i.e., above a line 906 indicating a zero amplitude, and a threshold (represented by a line 902) may be initially set to a value of the main cursor $h_0$. In some embodiments, the value of the main cursor $h_0$ may have been previously measured using the method of measuring the main cursor $h_0$ as illustrated in FIG. 7(*a*), FIG. 7(*b*) and FIG. 7(*c*). In some embodiments, when the value of the main cursor $h_0$ is measured, the start signal 431 (see FIG. 4) may be generated to cause the threshold delta calculator 424 to capture the current threshold value representing the value of the main cursor $h_0$. In some embodiments, the value of the main cursor $h_0$ may have been previously adapted to a desired target value (e.g., the target value 502 in FIG. 5(*a*), the target value 602 in FIG. 6(*a*) to FIG. 6(*b*)) using the method of adapting the main cursor $h_0$ as illustrated in FIG. 5(*a*) and FIG. 6(*a*) to FIG. 6(*c*). In some embodiments, when the value of the main cursor $h_0$ is adapted, the start signal 431 (see FIG. 4) may be generated to cause the threshold delta calculator 424 to capture the adapted desired value of the main cursor $h_0$.

FIG. 9(*a*) shows a case in which the current bit value is '1' and the next bit value is '1'. The effect of the next bit on the current signal amplitude is $h_{-1}$, indicated by an arrow 912, which gets added as indicated by an arrow 914. In some embodiments, the target cursor is set to the pre-cursor $h_{-1}$ (e.g., by setting the delays C and D in FIG. 4 to C-D=-1). In some embodiments, the target cursor is set to the pre-cursor $h_{-1}$ by setting C to 0 and D to 1 (see FIG. 4). In some embodiments, the setting of the target cursor may be triggered by the start signal 431 (see FIG. 4). In some embodiments, an initial threshold may be set to an expected target value, e.g., $h_0$, in this case, and a PDF representing distribution of errors (e.g., difference between the data signal sample and a value of the initial threshold) may be calculated by a correlation calculator (e.g., the correlation calculator 406 in FIG. 4). In some embodiments, an average (or mean, median or mode) of the PDF may be calculated by an accumulator (e.g., the accumulator 416 in FIG. 4), which only considers the correlations that satisfy the filter 412, i.e., current bit='1' and next bit='1'. In some embodiments, it may be determined whether an average 916 is greater than the current threshold value 902 (which may have been set to a measured value of the main cursor $h_0$). In some embodiments, the determination may be made by a comparator (e.g., the comparator 418 in FIG. 4) comparing the average 916 and the current threshold value 902. In response to determination that the average 916 is greater than the current threshold value 902, it may be determined that the value of the current threshold is too low. In some embodiments, in response to the determination that the value of the current threshold is too low, the current threshold value may be increased (e.g., moved up in FIG. 9(*a*)) by a predetermined step size. For example, in response to the determination that the value of the current threshold is too low, a controller of a receiver (e.g., the controller 410 in FIG. 4) may increase the current threshold value (e.g., the value represented by the threshold signal 425 in FIG. 4) by a predetermined step size (e.g., the step size represented by the signal 427 in FIG. 4).

On the other hand, in response to the determination that the value of the current threshold is too high, the current threshold value may be decreased (e.g., moved down in FIG. 9(*a*)) by a predetermined step size. For example, in response to the determination that the value of the current threshold is too high, the controller 410 (see FIG. 4) may decrease the current threshold value represented by the threshold signal 425 (see FIG. 4) by the predetermined step size represented by the signal 427 (see FIG. 4). This determination and adjustment (increase or decrease) may be repeated until the changed threshold value is equal to the average (or mean, median or mode) of the PDF of distribution of errors.

In some embodiments, the accumulator may accumulate, as an accumulated sign of error, i.e., an accumulated sign of a difference between data signal samples and a value of the current threshold. For example, when the number of positive errors is greater than the number of negative errors, it is determined that the value of the current threshold is too low; when the number of positive errors is smaller than the number of negative errors, it is determined that the value of the current threshold is too high; and when the two numbers are the same as each other, it is determined that the current threshold value is equal to the average of the PDF.

When the current threshold value is equal or nearly equal to the average of the PDF, the current threshold value may be output. For example, in response to the determination that the current threshold value is equal to the average of the PDF, the current threshold value may be output as the threshold signal 429 (see FIG. 4) by the controller of the receiver (e.g., the controller 410 in FIG. 4). In this manner, as shown in FIG. 9(*a*), the current threshold value of $(h_0+h_{-1})$ may be output to the threshold delta calculator 424. Subsequently, in some embodiments, the end signal 433 (see FIG. 4) may be generated to cause the threshold delta calculator 424 (see FIG. 4) to capture the current threshold value. The threshold delta calculator 424 may then output the difference between the previously captured threshold value (which represents a measured value of the main cursor $h_0$) and the currently captured threshold value, as a measured cursor value for the pre-cursor $h_{-1}$ (as the output signal 435 in FIG. 4). In some embodiments, the difference is proportional to $h_{-1}$ and the difference may be multiplied by a constant (e.g., -1) to output a value of the measured cursor value for the pre-cursor $h_{-1}$.

FIG. 9(*b*) shows a case in which the current bit value is '1' and the next bit value is '0'. The effect of the next bit on the current signal amplitude is $h_{-1}$, indicated by an arrow 922, which gets added as indicated by an arrow 924. In some embodiments, an initial threshold may be set to an expected target value, e.g., $h_0$, in this case, and a PDF representing distribution of errors (e.g., difference between data signal samples and a value of the initial threshold) may be calculated by a correlation calculator, and an average (or mean, median or mode) of the PDF may be calculated by an accumulator, which only considers the correlations that satisfy the filter 412, i.e., current bit='1' and next bit='0'. As shown in FIG. 9(b), the average of the PDF errors represents the value of ($h_0-h_{-1}$) 926 which may be output to the threshold delta calculator 424. The threshold could also be modified until it reaches the point where errors are null on average, i.e., when it reaches ($h_0-h_{-1}$). A measured cursor value for the pre-cursor $h_{-1}$ in FIG. 9(b) can be computed in a manner similar to those explained above with reference to FIG. 9(a), except that it is determined that the average 926 of the PDF is smaller than the current threshold value 902, and thus the constant should be negative.

FIG. 9(c) and FIG. 9(l), in some embodiments, when the current bit value is '0', measurement may be performed in a negative side of the eye diagram, i.e., below the line 906 indicating the zero amplitude, and a threshold (represented by a line 904) may be initially set to a negative value ($-h_0$) of the main cursor $h_0$. In some embodiments, the negative value of the main cursor ($-h_0$) may have been previously measured using the method similar to those of measuring the main cursor $h_0$ as illustrated in FIG. 7(a), FIG. 7(b) and FIG. 7(c). In some embodiments, when the negative value of the main cursor ($-h_0$) is measured, the start signal 431 (see FIG. 4) may be generated to cause the threshold delta calculator 424 to capture the current threshold value representing the negative value of the main cursor ($-h_0$). In some embodiments, the negative value of the main cursor may have been previously adapted to a desired target value (e.g., the target value 522 in FIG. 5(b)) using the method of adapting the main cursor $h_0$ as illustrated in FIG. 5(b). In some embodiments, when the negative value of the main cursor ($-h_0$) is adapted, the start signal 431 (see FIG. 4) may be generated to cause the threshold delta calculator 424 to capture the adapted negative threshold value of the main cursor ($-h_0$).

FIG. 9(c) shows a case in which the current bit value is '0' and the next bit value is '1'. The effect of the next bit on the current signal amplitude is $h_{-1}$, indicated by an arrow 932, which gets added as indicated by an arrow 934. In some embodiments, the target cursor is set to the pre-cursor $h_{-1}$ (e.g., by setting the delays C-D in FIG. 4 to −1, so as to select the pre-cursor $h_{-1}$). In some embodiments, the target cursor is set to the pre-cursor $h_{-1}$ by setting D to 1 (see FIG. 4). In some embodiments, the setting of the target cursor may be triggered by the start signal 431 (see FIG. 4). In some embodiments, an initial threshold may be set to an expected target value, e.g., $-h_0$, in this case, and a PDF representing distribution of errors (e.g., difference between the data signal sample and a value of the initial threshold) may be calculated by a correlation calculator (e.g., the correlation calculator 406 in FIG. 4). In some embodiments, an average (or mean, median or mode) of the PDF may be calculated by an accumulator (e.g., the accumulator 416 in FIG. 4), which only considers the correlations that satisfy the filter 412, i.e., current bit='0' and next bit='1'. In some embodiments, it may be determined that an average 936 is greater than the current threshold value 904, and in response to the determination, the current threshold value may be increased (e.g., moved up in FIG. 9(c)) by a predetermined step size.

FIG. 9(d) shows a case in which the current bit value is '0' and the next bit value is '0'. The effect of the next bit on the current signal amplitude is $-h_{-1}$, indicated by an arrow 942, which gets added as indicated by an arrow 944. In some embodiments, an initial threshold may be set to an expected target value, e.g., $-h_0$, in this case, and a PDF representing distribution of errors (e.g., difference between data signal samples and a value of the initial threshold) may be calculated by a correlation calculator, and an average (or mean, median or mode) of the PDF may be calculated by an accumulator, which only considers the correlations that satisfy the filter 412, i.e., current bit='0' and next bit='0'. As shown in FIG. 9(d), the average of the PDF errors represents the value of ($-h_0-h_{-1}$) 946 which may be output to the threshold delta calculator 424. The threshold could also be modified until it reaches the point where errors are null on average, i.e., when it reaches ($-h_0-h_{-1}$). A measured cursor value for the pre-cursor $h_{-1}$ in FIG. 9(d) can be computed in a manner similar to those explained above with reference to FIG. 9(c), except that it is determined that the average 946 of the PDF is smaller than the current threshold value 904, and thus the constant should be negative.

In some embodiments, a measured cursor value for the pre-cursor $h_{-1}$ (or any cursor other than the main cursor $h_0$) can be computed as a fraction of the value of the main cursor $h_0$. In some embodiments, a measured cursor value for a cursor may be computed as $$V_{cursor} = \frac{\text{Threshold}_{final} - \text{Threshold}_{ref}}{\text{Threshold}_{ref}} \qquad \text{Equation (1)}$$

where $\text{Threshold}_{final}$ is the final threshold value that is equal to the average of the PDF (i.e., the threshold value output from the threshold controller 422 to the threshold delta calculator 424; see FIG. 4), and $\text{Threshold}_{ref}$ is a reference threshold. In some embodiments, $\text{Threshold}_{ref}$ is a fixed value, for example, a measured value of the main cursor $h_0$. In some embodiments, if $\text{Threshold}_{ref}$ is fixed to the measured value of the main cursor $h_0$, what only needs to be measured is a delta that makes an accumulator (e.g., the accumulator 416 in FIG. 4) settle, i.e., the final threshold value $\text{Threshold}_{final}-\text{Threshold}_{ref}$. In some embodiments, $\text{Threshold}_{final}$ and $\text{Threshold}_{ref}$ in Equation (1) may be an amplitude of an electric signal (e.g., voltage or current signal). In some embodiments, $\text{Threshold}_{final}$ and $\text{Threshold}_{ref}$ in Equation (1) may be threshold codes.

In some embodiments, referring to FIG. 4, the partial receiver 400 may include a plurality of error samplers 402. In some embodiments, if the partial receiver 400 includes two error samplers connected to the accumulator 416 (but having separate threshold values for respective error samplers), two cursor measurements may be accumulated at the same time to obtain a measured cursor value for a cursor other than the main cursor. For example, out of the four cases illustrated in FIG. 9(a)-FIG. 9(d), the measurement of FIG. 9(a), in which the current bit=1 and the next bit=1, and the measurement of FIG. 9(d), in which the current bit=0 and the next bit=0, can be accumulated at the same time, so that a different offset (e.g., offsets in terms of errors on the reference threshold or errors on input data) can be canceled with each other. In this manner, a measured cursor value for the pre-cursor $h_{-1}$ can be obtained from the two measurements. Similarly, the measurement of FIG. 9(b), in which the current bit=1 and the next bit=0, and the measurement of FIG. 9(c), in which the current bit=0 and the next bit=1, can be accumulated at the same time, so that a different offset can be canceled with other. In some embodiments, if the partial receiver 400 includes four error samplers connected to the accumulator 416 (but having separate threshold values for respective error samplers), all of the four measurements of in FIG. 9(a)-FIG. 9(d) can be accumulated at the same time to obtain a measured cursor value for the pre-cursor $h_{-1}$.

In some embodiments, a receiver device (e.g., the receiver 220 in FIG. 2 or the partial receiver 400 in FIG. 4) may include first circuitry (e.g., the core processing circuitry 302 in FIG. 3) and memory (e.g., the memory 306 in FIG. 3). The first circuitry may convert an input signal received from a transmitter (e.g., the transmitter 210 in FIG. 2) into a data signal. In some embodiments, the data signal includes data symbols (e.g., bit value "0" or "1") transmitted in successive unit intervals (UIs). The first circuitry may determine a first threshold (e.g., the desired target value 502 in FIG. 5(a)) associated with a first symbol type (e.g., bit value "1"). The first circuitry may adjust a gain of the receiver device such that an average amplitude of data signal samples, when receiving data symbols having the first symbol type (e.g., bit value "1"), corresponds to the first threshold (e.g., the desired target value 502 in FIG. 5(a)). The first circuitry may determine a second threshold (e.g., the average 926 in FIG. 9(b)) that corresponds to an average amplitude of the data signal samples when data symbols of a current UI have the first symbol type (e.g., the current bit value="1" in FIG. 9(b)) and data symbols of a first UI, at a first determined time distance from the current UI (e.g., the next UI, which relates to the pre-cursor $h_{-1}$), have a second symbol type (e.g., the next bit value="0" in FIG. 9(b)). The first circuitry may compute, as a first cursor value associated with the first UI (e.g., a measured value of the pre-cursor $h_{-1}$ in FIG. 9(b)), a first difference between the first threshold and the second threshold, multiplied by a first constant (e.g., a constant such that the first difference multiplied by the constant represents $h_{-1}$ in sign and magnitude). In some embodiments, the second threshold may correspond to the first cursor value plus a non-zero value (e.g., the average 926 in FIG. 9(b) is the first cursor 920 plus a non-zero value).

In some embodiments, the first circuitry may determine a third threshold (e.g., the desired target value 522 in FIG. 5(b)) associated with a third symbol type (e.g., bit value "0") that is different from the first symbol type (e.g., bit value "1"). The first circuitry may adjust a gain of the receiver device such that an average amplitude of the data signal samples, when receiving data symbols having the third symbol type (e.g., bit value "0"), corresponds to the third threshold (e.g., the desired target value 522 in FIG. 5(b)). The first circuitry may determine a fourth threshold (e.g., the average 946 in FIG. 9(d)) that corresponds to an average amplitude of the data signal samples when data symbols of the current UI have the third symbol type (e.g., the current bit value="0" in FIG. 9(d)) and data symbols of the first UI (e.g., the next UI) have the second symbol type (e.g., the next bit value="0" in FIG. 9(d)). The first circuitry may compute a second difference (e.g., a measured value of the pre-cursor $h_{-1}$ in FIG. 9(d)) between the third threshold and the fourth threshold, multiplied by a second constant (e.g., a constant such that the second difference multiplied by the constant represents $h_{-1}$ in sign and magnitude). The first circuitry may compute, as a second cursor value associated with the first UI, an average of the first difference and the second difference multiplied by their respective first and second constants (e.g., computing a measured value of the pre-cursor $h_{-1}$ by averaging the measured value of the pre-cursor $h_{-1}$ in FIG. 9(b) and measured value of the pre-cursor $h_{-1}$ in FIG. 9(d) using the average calculator 440 in FIG. 4).

In some embodiments, the first circuitry may further determine a fifth threshold (e.g., the desired target value 502 in FIG. 5(a)) that corresponds to an average amplitude of the data signal samples when data symbols of the current UI have the first symbol type (e.g., the current bit value="1" in FIG. 9(a)) and data symbols of the first UI (e.g., the next UI) have a fourth symbol type (e.g., the next bit value="1" in FIG. 9(a)) that is different from the second symbol type. The first circuitry may compute a third difference (e.g., a measured value of the pre-cursor $h_{-1}$ in FIG. 9(a)) between the first threshold and the fifth threshold, multiplied by a third constant (e.g., a constant such that the third difference multiplied by the constant represents $h_{-1}$ in sign and magnitude). The first circuitry may compute, as a third cursor value associated with the first UI, an average of the first difference and the third difference multiplied by their respective first and third constants (e.g., computing a measured value of the pre-cursor $h_{-1}$ by averaging the measured value of the pre-cursor $h_{-1}$ in FIG. 9(b) and measured value of the pre-cursor $h_{-1}$ in FIG. 9(a) using the average calculator 440 in FIG. 4).

In some embodiments, the first threshold may be a plurality of first thresholds associated with different symbol types (e.g., the threshold value 902 associated with bit value "1" in FIG. 9(a) and FIG. 9(b), and the threshold value 904 associated with bit value "0" in FIG. 9(c) and FIG. 9(d)). The second threshold may be a plurality of second thresholds associated with different symbol types (e.g., the average 916 associated with next bit value "1" in FIG. 9(a), the average 926 associated with next bit value "0" in FIG. 9(b), the average 936 associated with next bit value "1" in FIG. 9(c), and the average 946 associated with next bit value "0" in FIG. 9(d)). The first circuitry may further compute a plurality of differences, each difference being a difference between one of the plurality of first thresholds and one of the plurality of second thresholds (e.g., the difference between the threshold value 902 and the average 916 in FIG. 9(a), the difference between the threshold value 902 and the average 926 in FIG. 9(b), the difference between the threshold value 904 and the average 936 in FIG. 9(c), and the difference between the threshold value 904 and the average 946 in FIG. 9(d)). The first circuitry may further compute, as a fourth cursor value associated with the first UI, an average of the plurality of differences multiplied by respective constants (e.g., computing a measured value of the pre-cursor $h_{-1}$ by averaging the measured values of the pre-cursor $h_{-1}$ in FIG. 9(a)-FIG. 9(d), multiplied by respective constants that make the respective measured values represent $h_{-1}$ in sign and magnitude, using the average calculator 440 in FIG. 4).

In some embodiments, in adjusting the gain of the receiver device, the first circuitry may further adjust the gain of the receiver device such that a median amplitude of the data signal samples (e.g., the value 508 in FIG. 5(a) and the value 528 in FIG. 5(b)), when receiving the data symbols having the first symbol type, corresponds to the first threshold (e.g., the value 502 in FIG. 5(a) and the value 522 in FIG. 5(b)).

In some embodiments, in determining the second threshold, the first circuitry may further determine the second threshold that corresponds to a median amplitude of the data signal samples (e.g., the average or median 926 in FIG. 9(b)) when the data symbols of the current UI have the first symbol type (e.g., current bit value "1" in FIG. 9(b)) and the data symbols of a first UI have the second symbol type (e.g., next bit value "0" in FIG. 9(b)).

In some embodiments, in determining the first threshold, the first circuitry may further determine the first threshold that corresponds to an average amplitude of the data signal samples (e.g., the value 508 in FIG. 5(a) and the value 528 in FIG. 5(b)) when data symbols of the current UI have the first symbol type.

In some embodiments, the receiver device may further include an accumulator (e.g., the accumulator 416 in FIG. 4). In determining the second threshold, the accumulator may accumulate, as an accumulated sign of error (e.g., positive if the number of positive errors is greater than the number of negative errors; negative if the number of positive errors is smaller than the number of negative errors; zero if the number of positive errors is the same as the number of negative errors), a difference between the second threshold and an amplitude of the data signal samples when the data symbols of the current UI have the first symbol type and the data symbols of the first UI have the second symbol type, and the first circuitry may further move the second threshold until the accumulated sign of error becomes zero. For example, if the accumulated sign of error is positive, a controller of a receiver (e.g., the controller 410 in FIG. 4) may increase the current second threshold value (e.g., the value represented by the threshold signal 425 in FIG. 4) by a predetermined step size (e.g., the step size represented by the signal 427 in FIG. 4); and if the accumulated sign of error is negative, the controller may decrease the current threshold value by the predetermined step size.

In some embodiments, in determining the second threshold, the accumulator may further determine whether the accumulated error is positive or negative, in response to determination that the accumulated error is positive, the first circuitry is further configured to move the second threshold so as to reduce the accumulated error (e.g., by increasing the current threshold value). In response to determination that the accumulated error is negative, the first circuitry may further move the second threshold so as to increase the accumulated error (e.g., by decreasing the current threshold value).

FIG. 10(a) and FIG. 10(b) are eye diagrams illustrating an example aspect of measuring cursors other than the main cursor according to some embodiments.

In some cases, the measured threshold values (e.g., $(h_0+h_{-1})$ and $(-h_0-h_{-1})$) may be sensitive to an error on $h_0$ with respect to a reference threshold. For example, if the reference threshold is set to $k*h_0$, $(1-k)*h_0$ may be seen as an error on the measured $h_{-1}$. In some embodiments, if gain is coarse, this error can be reduced by fine-tuning the threshold values (or voltages) for a fixed gain. In some embodiments, in a case where the granularity of the threshold values is better (or smaller) than the granularity of the gain steps, the threshold values can be adjusted individually for each case of possible polarity combinations (e.g., each case of those illustrated in FIG. 9(a) to FIG. 9(d)).

For example, referring to FIG. 10(a), in a case where the current data sample is '0' and the next bit value is '0', measurement may be performed in a negative side of the eye diagram, i.e., below a line 1002 indicating a zero amplitude, and a threshold $h'_0$ (represented by a line 1016) may be initially set to a value of the main cursor $h_0$, multiplied by −1 (represented by line 1018), which is subject to an error with respect to the main cusor value $h_0$. In some embodiments, after the current threshold value of $(-h_0-h_{-1})$, represented by a line 1020, is measured, the value of $h_{-1}$ (1012) is estimated using the erroneous value of the main cursor $h'_0$, i.e., $-1*(-h_0-h_{-1}+h'_0)$, producing an error of $h_0-h'_0$.

Similarly, referring to FIG. 10(b), in a case where the bit value of the current bit is '1' and the next bit value is '1', measurement may be performed in a positive side of the eye diagram, i.e., above the line 1002, and a threshold $h''_0$ (represented by a line 1026) may be initially set to a value of the main cursor $h_0$ (represented by line 1028), which is subject to an error with respect to the actual main cursor value $h_0$. In some embodiments, after the current threshold value of $(h_0+h_{-1})$ is measured, the value of $h_{-1}$ (1022) is estimated using the erroneous value of the main cursor $h''_0$, i.e., $+1*(h_0+h_{-1}-h''_0)$, producing an error of $h_0-h''_0$. In some embodiments, the two results are averaged, producing an error of $(2*h_0-h'_0-h''_0)/2$. An offset in the input signal (i.e., value $v_{off}$) will produce the same effect as setting $h'_0=h_0+v_{off}$, and $h''_0=h_0-v_{off}$. Thus, the error of the average will be zero, effectively removing the effect of input signal offsets.

FIG. 11(a) and FIG. 11(b) are eye diagrams illustrating an example aspect of measuring cursors other than the main cursor according to some embodiments.

Referring to FIG. 11(a), in a case where the current data sample is '0' and the next bit value is '1', measurement may be performed in a negative side of the eye diagram, i.e., below a line 1102 indicating a zero amplitude, a threshold $h'_0$ (represented by a line 1118) may be initially set to a negative value of the main cursor $h_0$, multiplied by −1, which is subject to an error with respect to gain variations or distortions, i.e., an erroneous zero amplitude indicated by 1104. In some embodiments, after the current threshold value of $(-h_0+h_{-1})$, represented by a line 1116, is measured, the value of $h_{-1}$ (1112) is estimated using the erroneous value $h'_0$, i.e., $1*(-h_0+h_{-1})+h'_0$, producing an error of $h'_0-h_0$.

Similarly, referring to FIG. 11(b), in a case where the current data sample is '1' and the next bit value is '1', measurement may be performed in a positive side of the eye diagram, i.e., below a line 1102 indicating a zero amplitude, a threshold $h''_0$ (represented by a line 1126) may be initially set to a positive value of the main cursor $h_0$, multiplied by 1, which is subject to an error with respect to gain variations or distortions, i.e., an erroneous zero amplitude indicated by 1104. In some embodiments, after the current threshold value of $(h_0+h_{-1})$, represented by a line 1128, is measured, the value of $h_{-1}$ (1122) is estimated using the erroneous value $h''_0$, i.e., $1*(h_0+h_{-1})-h''_0$, producing an error of $h_0-h''_0$.

In some embodiments, assuming $h'_0=h''_0=k*h_0$, the two results are averaged, producing an error of $(h'_0-h''_0)/2=0$, which will yield zero for the assumed gain imprecision. Therefore, this would also be good to reduce distortion errors. That is, if larger signals are reduced due to non-linearities (which may lead to gain variations or distortions), it is similar to the case of having effectively a higher threshold for the "outer" cases (e.g., FIG. 11(b)). Therefore, if, for example, $h'_0=h_0$ and $h''_0=h_0+v_{dist}$, where $v_{dist}$ is an equivalent distortion error, on average, the error can be reduced to $v_{dist}/2$ which indicates that the error is not completely removed, but can be reduced by half.

Figure 12:
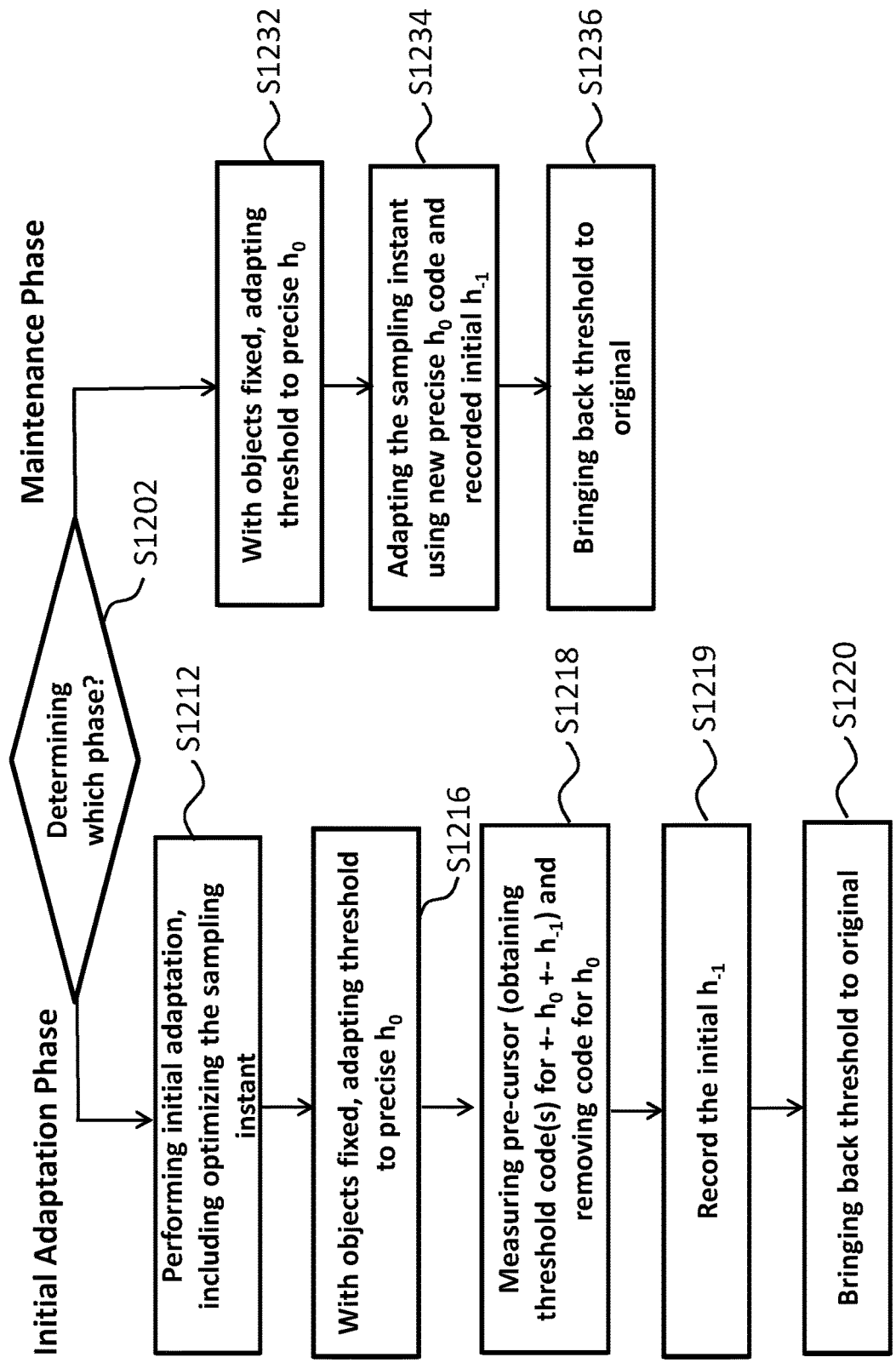
FIG. 12 is a flowchart illustrating an example methodology for measuring a value of a cursor and maintaining the value according to some embodiments.

FIG. 12 is a flowchart illustrating an example methodology for measuring a value of a cursor and maintaining the value according to some embodiments.

In this example, the process begins in step S1202 by determining, by first circuitry (e.g., the core processing circuitry 302 in FIG. 3) of a receiver device (e.g., the receiver 220 in FIG. 2 or the partial receiver 400 in FIG. 4), whether the current process is in an initial adaptation phase or in a maintenance phase. If the current process is determined to be in the initial adaptation phase, the process goes to step S1212. Otherwise, if the current process is determined to be in the maintenance phase, the process goes to step S1232.

In step S1212 (in the initial adaptation phase), an initial adaptation of the equalization is performed. This optimizes the sampling instant to maximize the eye opening.

In step S1216, with equalization objects (e.g., DFE taps, etc.) fixed, a threshold value may be adapted to a precise value of the main cursor (e.g., $h_0$) by the first circuitry. In some embodiments, the precise value of the main cursor $h_0$ may have been previously measured using the method of measuring the main cursor $h_0$ as illustrated in FIG. 7(a), FIG. 7(b) and FIG. 7(c). In some embodiments, a threshold code may be adapted to a precise code of the main cursor (e.g., $h_0$) by the first circuitry.

In step S1218, the pre-cursor (e.g., $h_{-1}$) may be measured by first obtaining a threshold value representing a combination of $h_0$ and $h_{-1}$ (e.g., $(+h_0+h_{-1})$ or $(+h_0-h_{-1})$ or $(-h_0+h_{-1})$ or $(-h_0-h_{-1})$) and then removing the value of the main cursor $h_0$ from the threshold value. In some embodiments, a threshold code (or threshold codes) representing a combination of $h_0$ and $h_{-1}$ may be first obtained and then a precise code for $h_0$ may be removed from the threshold code.

In step S1219, the initial $h_{-1}$ value is recorded. In some embodiments, the ratio of $h_{-1}$ to $h_0$ may also be recorded, as well as the initial $h_0$ value. In some other embodiments, codes representing $h_{-1}$, $h_{-1}/h_0$ and/or $h_0$ may be recorded.

In step S1220, the threshold value or code may be brought back (or recovered) to an original threshold value so as to allow the adaptation to be performed in the same condition as previously in the initial adaptation.

In step S1232 (in the maintenance phase), with equalization objects (e.g., DFE taps, etc.) fixed, a threshold may be adapted to a precise value of the main cursor (e.g., $h_0$) by the first circuitry to track the receiver equalizer gain drift, which can be produced by changes in the environmental conditions since the initial adaptation, e.g., changes in voltage, temperature, device aging, etc. In some embodiments, the precise value of the main cursor $h_0$ may be measured using the method of measuring the main cursor $h_0$ as illustrated in FIG. 7(a), FIG. 7(b) and FIG. 7(c). In some embodiments, a threshold code may be adapted to a precise code of the main cursor (e.g., $h_0$) by the first circuitry.

In step S1234, the sampling instant may be adapted using (1) the new precise value of the main cursor (e.g., $h_0$) obtained in step S1232 and (2) a recorded value of the pre-cursor (e.g., a value of $h_{-1}$ recorded or stored in the memory 306 in FIG. 3). In some embodiments, the sampling instant may be adapted using (1) the new precise code of the main cursor (e.g., $h_0$) obtained in step S1232 and (2) a recorded code of the pre-cursor. In some embodiments, this adaptation is performed using the method of adapting to a non-zero cursor other than main, as described in FIG. 8.

In step S1236, the threshold value or code may be brought back (or recovered) to an original threshold value so as to allow the adaptation to be performed in the same condition as previously in the initial adaptation.

Figure 13:
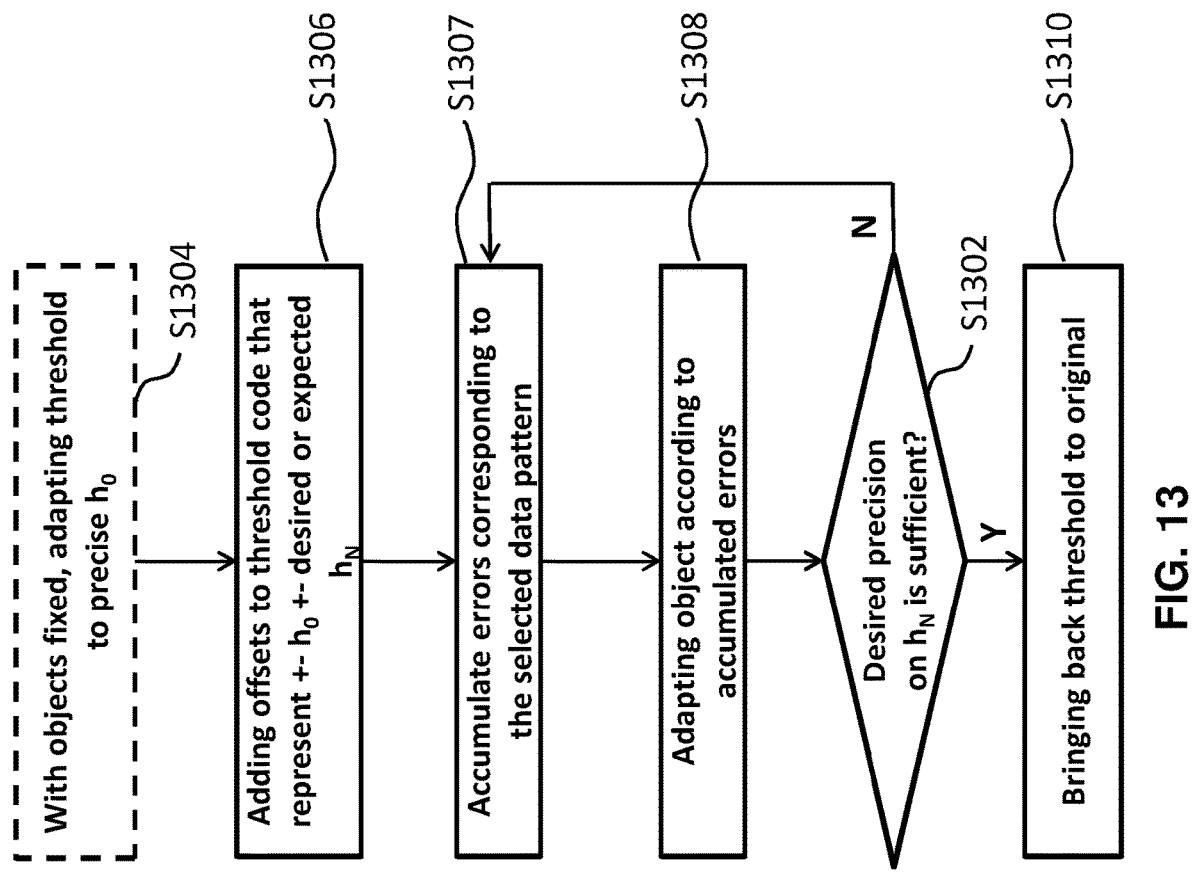
FIG. 13 is a flowchart illustrating an example methodology for adapting cursors other than the main cursor according to some embodiments.

FIG. 13 is a flowchart illustrating an example methodology for adapting equalization objects such as to maintain cursors other than the main cursor according to some embodiments. This can also illustrate how to measure a specific cursor ($h_N$), by means of adapting the threshold code in lieu of the equalization object.

In this example, the process begins in step 1301, where the initial threshold $h_0$ is recorded. This step is optional.

In step S1304, with equalization objects (e.g., DFE taps, signal gain, etc.) fixed, a threshold value may be adapted to a precise value of the main cursor (e.g., $h_0$) by the first circuitry. In some embodiments, the precise value of the main cursor $h_0$ may have been previously measured using the method of measuring the main cursor $h_0$ as illustrated in FIG. 7(a), FIG. 7(b) and FIG. 7(c). In some embodiments, a threshold code may be adapted to a precise code of the main cursor (e.g., $h_0$) by the first circuitry. This step is optional.

In step S1306, the threshold value may be set to a value that represents a combination of $h_0$ and $h_N$ (e.g., $(+h_0+h_N)$ or $(+h_0-h_N)$ or $(-h_0+h_N)$ or $(-h_0-h_N)$). In some embodiments, the threshold code may be set to a code that represents a combination of $h_0$ and $h_N$ (e.g., $(+h_0+h_N)$ or $(+h_0-h_N)$ or $(-h_0+h_N)$ or $(-h_0-h_N)$).

In step 1307, the errors corresponding to the selected data pattern (corresponding to the selected threshold or threshold code from S1306) are accumulated to compute the average (or mean, median or mode) of the PDF or to compute whether the cursor $h_N$ (e.g., the average 916 in FIG. 9(a)) is below or above the desired value set by the threshold (e.g., the threshold 902 in FIG. 9(a)).

In step S1308, an equalization object (e.g., the sampling instant, like in FIG. 12 S1234) may be adapted using the threshold or code obtained in step S1306. For example, referring to FIG. 8(a), to adapt to a target pre-cursor $h_{-1}$, an average (e.g., mean, mode, or median) of a PDF of errors (e.g., difference between the data samples and a zero threshold, correlated with appropriate values of current and historical bit values) may be obtained. The average of the PDF of errors may be compared with the threshold obtained in step S1306 to determine whether the equalization object is high or low. As shown in FIG. 8(a), the average of the PDF of errors is $h_0+h_{-1}$ (represented by a line 816) which may be greater or lower than the desired threshold (not shown). If it is determined that the average of PDF of errors is too high, the equalization object controlling the sampling instant may be adapted so that $h_{-1}$ be decreased. The correct direction for moving the sampling instant may be determined by trying a first direction, then changing if the resulting variation in the average of PDF of errors does not move towards the desired threshold. On the other hand, in response to the determination that the average of PDF of errors is too low, the equalization object controlling pre-cursor $h_{-1}$ may be adapted so the latter be increased.

In some embodiments, the equalization object being controlled is the threshold. As described in FIG. 9, this allows measuring the selected cursor, as used in FIG. 12, step S1219.

In step S1302, the first circuitry determines whether a precision of a value of a cursor (e.g., $h_{-1}$) is sufficient. In some embodiments, it may be determined whether the precision of the value of the cursor is substantially the same as a desired precision. If it is determined that the precision of the pre-cursor is not sufficient, the process goes to step S1307. Otherwise, if it is determined that the precision of the pre-cursor is sufficient, the process goes to step S1310.

In step S1310, the threshold value or code may be brought back (or recovered) to an initial threshold value (such as recorded in step S1301) so as to allow the adaptation to be performed in the same condition as previously in the initial adaptation.

Figure 14:
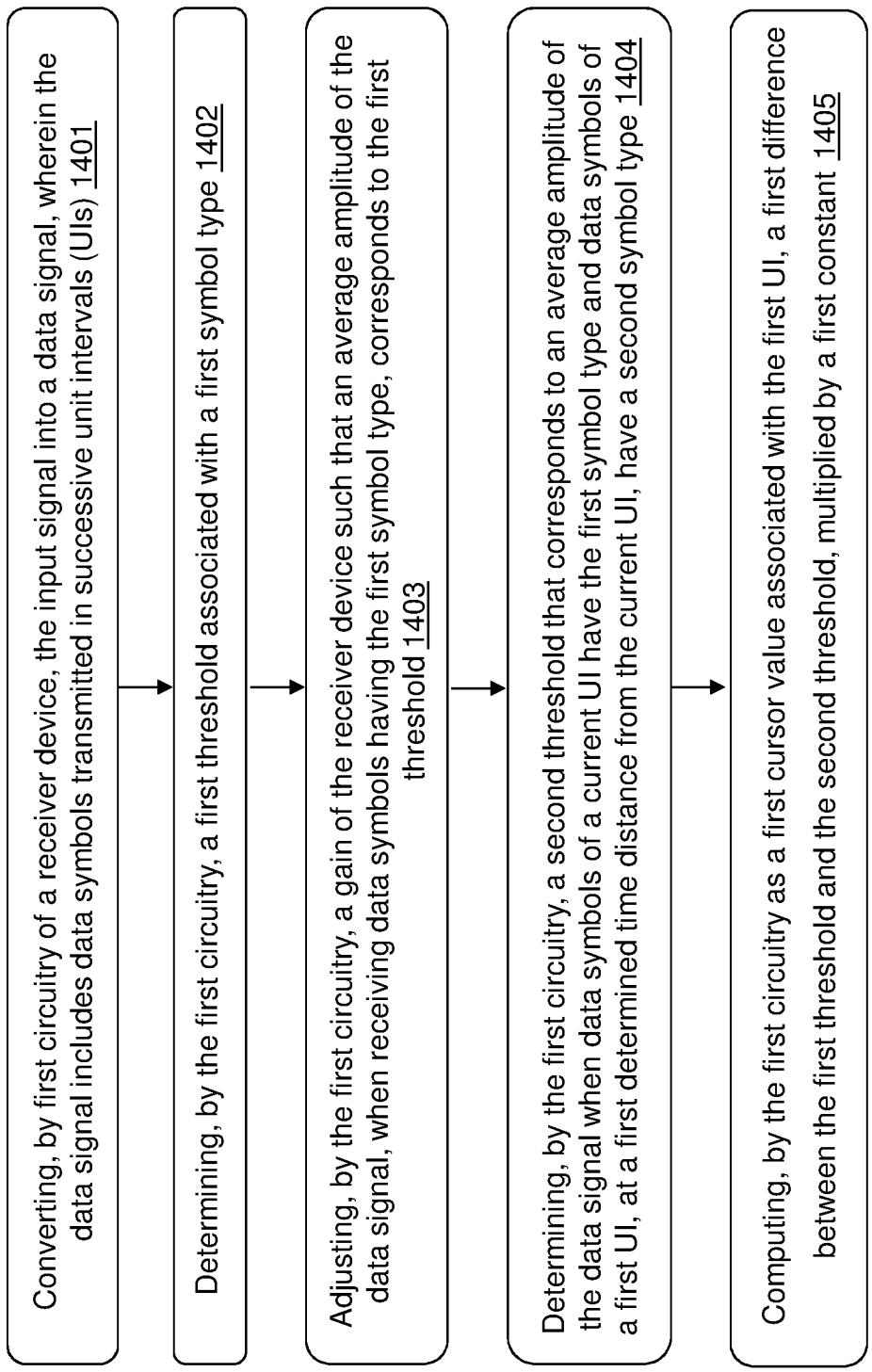
FIG. 14 is a flowchart illustrating an example methodology for measuring values of pulse response cursors in an input signal from a transmitter according to some embodiments.

FIG. 14 is a flowchart illustrating an example methodology for measuring values of pulse response cursors in an input signal from a transmitter (e.g., the transmitter 210 in FIG. 2) according to some embodiments.

In this example, the process begins in step S1401 by converting, by first circuitry (e.g., the core processing circuitry 302 in FIG. 3) of a receiver device (e.g., the receiver 220 in FIG. 2 or the partial receiver 400 in FIG. 4), the input signal into a data signal that includes data symbols (e.g., bit value "0" or "1") transmitted in successive unit intervals (UIs).

In step S1402, a first threshold (e.g., the desired target value 502 in FIG. 5(a)) associated with a first symbol type (e.g., bit value "1") may be determined by the first circuitry. In some embodiments, determining the first threshold may include determining, by the first circuitry, the first threshold that corresponds to an average amplitude of data signal samples (e.g., the value 508 in FIG. 5(a) and the value 528 in FIG. 5(b)) when data symbols of a current UI (e.g., the main cursor $h_0$) have the first symbol type (e.g., bit value "1").

In step S1403, a gain of the receiver device may be adjusted by the first circuitry, such that an average amplitude of the data signal samples, when receiving data symbols having the first symbol type (e.g., bit value "1), corresponds to the first threshold (e.g., the desired target value 502 in FIG. 5(a)). In some embodiments, adjusting the gain of the receiver device may include adjusting, by the first circuitry, the gain of the receiver device such that a median amplitude of the data signal samples (e.g., the value 508 in FIG. 5(a) and the value 528 in FIG. 5(b)), when receiving the data symbols having the first symbol type, corresponds to the first threshold (e.g., the value 502 in FIG. 5(a) and the value 522 in FIG. 5(b)).

In step S1404, a second threshold (e.g., the average 926 in FIG. 9(b)) that corresponds to an average amplitude of the data signal samples when data symbols of the current UI have the first symbol type (e.g., the current bit value="1" in FIG. 9(b)) and data symbols of a first UI (e.g., the next UI), at a first determined time distance from the current UI, have a second symbol type (e.g., the next bit value="0" in FIG. 9(b)), may be determined by the first circuitry. In some embodiments, determining the second threshold may include determining, by the first circuitry, the second threshold that corresponds to a median amplitude of the data signal samples (e.g., the average or median 926 in FIG. 9(b)) when the data symbols of the current UI have the first symbol type and the data symbols of a first UI have the second symbol type.

In some embodiments, determining the second threshold may include accumulating, by an accumulator of the receiver device (e.g., the accumulator 416 in FIG. 4) as an accumulated sign of error (e.g., positive if the number of positive errors is greater than the number of negative errors; negative if the number of positive errors is smaller than the number of negative errors; zero if the number of positive errors is the same as the number of negative errors), a difference between the second threshold and an amplitude of the data signal samples when the data symbols of the current UI have the first symbol type and the data symbols of the first UI have the second symbol type. In some embodiments, determining the second threshold may include moving, by the first circuitry, the second threshold until the accumulated sign of error becomes zero. For example, if the accumulated sign of error is positive, a controller of a receiver (e.g., the controller 410 in FIG. 4) may increase the current threshold value (e.g., the value represented by the threshold signal 425 in FIG. 4) by a predetermined step size (e.g., the step size represented by the signal 427 in FIG. 4); and if the accumulated sign of error is negative, the controller may decrease the current threshold value by the predetermined step size.

In some embodiments, determining the second threshold may further include determining, by the accumulator, whether the accumulated error is positive or negative. In response to determination that the accumulated error is positive, the second threshold may be moved by the first circuitry, so as to reduce the accumulated error (e.g., by increasing the current threshold value). In response to determination that the accumulated error is negative, the second threshold may be moved by the first circuitry so as to increase the accumulated error (e.g., by decreasing the current threshold value).

In step S1405, a first difference between the first threshold and the second threshold, multiplied by a first constant (e.g., a constant such that the first difference multiplied by the constant represents the selected cursor in sign and magnitude), may be computed by the first circuitry as a first cursor value associated with the first UI (e.g., a measured value of the pre-cursor $h_{-1}$ in FIG. 9(b)). In some embodiments, the second threshold may correspond to the first cursor value plus a non-zero value (e.g., the shifted average 926 in FIG. 9(b) is a non-zero value).

In some embodiments, the method may include determining, by the first circuitry, a third threshold (e.g., the desired target value 522 in FIG. 5(b)) associated with a third symbol type (e.g., bit value "0") that is different from the first symbol type (e.g., bit value "1"). A gain of the receiver device may be adjusted by the first circuitry such that an average amplitude of the data signal samples, when receiving data symbols having the third symbol type (e.g., bit value "0"), corresponds to the third threshold (e.g., the desired target value 522 in FIG. 5(b)). A fourth threshold (e.g., the average 946 in FIG. 9(d)) that corresponds to an average amplitude of the data signal samples when data symbols of the current UI have the third symbol type (e.g., the current bit value="0" in FIG. 9(d)) and data symbols of the first UI (e.g., the next UI) have the second symbol type (e.g., the next bit value="0" in FIG. 9(d)), may be determined by the first circuitry. A second difference e.g., a measured value of the pre-cursor $h_{-1}$ in FIG. 9(d)) between the third threshold and the second threshold, multiplied by a second constant (e.g., a constant such that the second difference multiplied by the constant represents the selected cursor in sign and magnitude), may be computed by the first circuitry. An average of the first difference and the second difference may be computed by the first circuitry as a second cursor value associated with the first UI (e.g., a measured value of the pre-cursor $h_{-1}$ may be computed by averaging the measured value of the pre-cursor $h_{-1}$ in FIG. 9(b) and measured value of the pre-cursor $h_{-1}$ in FIG. 9(d) using the average calculator 440 in FIG. 4).

In some embodiments, the method may include determining, by the first circuitry, a fifth threshold (e.g., the desired target value 502 in FIG. 5(a)) that corresponds to an average amplitude of the data signal samples when data symbols of the current UI have the first symbol type (e.g., the current bit value="1" in FIG. 9(a)) and data symbols of the first UI (e.g., the next UI) have a fourth symbol type (e.g., the next bit value="1" in FIG. 9(a)) that is different from the second symbol type. A third difference (e.g., a measured value of the pre-cursor $h_{-1}$ in FIG. 9(a)) between the first threshold and the fifth threshold, multiplied by a third constant (e.g., a constant such that the third difference multiplied by the constant represents the selected cursor in sign and magnitude) may be computed by the first circuitry. An average of the first difference and the third difference (e.g., computing a measured value of the pre-cursor $h_{-1}$ by averaging the measured value of the pre-cursor $h_{-1}$ in FIG. 9(b) and measured value of the pre-cursor $h_{-1}$ in FIG. 9(a) using the average calculator 440 in FIG. 4) may be computed by the first circuitry as a third cursor value associated with the first UI.

In some embodiments, the first threshold may be a plurality of first thresholds associated with different symbol types (e.g., the threshold value 902 associated with bit value "1" in FIG. 9(a) and FIG. 9(b), and the threshold value 904 associated with bit value "0" in FIG. 9(c) and FIG. 9(d)), and the second threshold may be a plurality of second thresholds associated with different symbol types (e.g., the average 916 associated with next bit value "1" in FIG. 9(a), the average 926 associated with next bit value "0" in FIG. 9(b), the average 936 associated with next bit value "1" in FIG. 9(c), and the average 946 associated with next bit value "0" in FIG. 9(d)). In some embodiments, the method may include computing, by the first circuitry, a plurality of differences, each difference being a difference between one of the plurality of first thresholds and one of the plurality of second thresholds (e.g., the difference between the threshold value 902 and the average 916 in FIG. 9(a), the difference between the threshold value 902 and the average 926 in FIG. 9(b), the difference between the threshold value 904 and the average 936 in FIG. 9(c), and the difference between the threshold value 904 and the average 946 in FIG. 9(d)). An average of the plurality of differences multiplied by respective constants may be computed by the first circuitry as a fourth cursor value associated with the first UI (e.g., a measured value of the pre-cursor $h_{-1}$ may be computed by averaging the measured values of the pre-cursor $h_{-1}$ in FIG. 9(a)-FIG. 9(d), multiplied by respective constants that make the respective measured values represents the selected cursor in sign and magnitude, using the average calculator 440 in FIG. 4).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for measuring values of pulse response cursors in an input signal from a transmitter, the method comprising:
    converting, by first circuitry of a receiver device, the input signal into a data signal, wherein the data signal includes data symbols transmitted in successive unit intervals (UIs);
    determining, by the first circuitry, a first threshold associated with a first symbol type;
    adjusting, by the first circuitry, a gain of the receiver device such that an average amplitude of data signal samples, when receiving data symbols having the first symbol type, corresponds to the first threshold;
    determining, by the first circuitry, a second threshold that corresponds to an average amplitude of the data signal samples when data symbols of a current UI have the first symbol type and data symbols of a first UI, at a first determined time distance from the current UI, have a second symbol type; and
    computing, by the first circuitry as a first cursor value associated with the first UI, a first difference between the first threshold and the second threshold, multiplied by a first constant.

2. The method of claim 1, further comprising:
    determining, by the first circuitry, a third threshold associated with a third symbol type that is different from the first symbol type;
    adjusting, by the first circuitry, a gain of the receiver device such that an average amplitude of the data signal samples, when receiving data symbols having the third symbol type, corresponds to the third threshold;
    determining, by the first circuitry, a fourth threshold that corresponds to an average amplitude of the data signal samples when data symbols of the current UI have the third symbol type and data symbols of the first UI have the second symbol type;
    computing, by the first circuitry, a second difference between the third threshold and the fourth threshold, multiplied by a second constant; and
    computing, by the first circuitry as a second cursor value associated with the first UI, an average of the first difference and the second difference.

3. The method of claim 1, further comprising:
    determining, by the first circuitry, a fifth threshold that corresponds to an average amplitude of the data signal samples when data symbols of the current UI have the first symbol type and data symbols of the first UI have a fourth symbol type that is different from the second symbol type;
    computing, by the first circuitry, a third difference between the first threshold and the fifth threshold, multiplied by a third constant; and
    computing, by the first circuitry as a third cursor value associated with the first UI, an average of the first difference and the third difference.

4. The method of claim 1, wherein:
    the first threshold is a plurality of first thresholds associated with different symbol types, and
    the second threshold is a plurality of second thresholds associated with different symbol types,
    the method further comprising:
    computing, by the first circuitry, a plurality of differences, each difference being a difference between one of the plurality of first thresholds and one of the plurality of second thresholds; and
    computing, by the first circuitry as a fourth cursor value associated with the first UI, an average of the plurality of differences multiplied by respective constants.

5. The method of claim 1, wherein adjusting the gain of the receiver device comprises:
    adjusting, by the first circuitry, the gain of the receiver device such that a median amplitude of the data signal samples, when receiving the data symbols having the first symbol type, corresponds to the first threshold.

6. The method of claim 1, wherein determining the second threshold comprises:
    determining, by the first circuitry, the second threshold that corresponds to a median amplitude of the data signal samples when the data symbols of the current UI have the first symbol type and the data symbols of a first UI have the second symbol type.

7. The method of claim 1, wherein the second threshold corresponds to the first cursor value plus a non-zero value.

8. The method of claim 1, wherein determining the first threshold comprises:
    determining, by the first circuitry, the first threshold that corresponds to an average amplitude of the data signal samples when data symbols of the current UI have the first symbol type.

9. The method of claim 1, wherein determining the second threshold comprises:
    accumulating, by an accumulator of the receiver device as an accumulated sign of error, a difference between the second threshold and an amplitude of the data signal samples when the data symbols of the current UI have the first symbol type and the data symbols of the first UI have the second symbol type; and moving, by the first circuitry, the second threshold until the accumulated sign of error becomes zero.

10. The method of claim 1, wherein determining the second threshold further comprises:
   determining, by the accumulator, whether the accumulated error is positive or negative;
   in response to determination that the accumulated error is positive, moving, by the first circuitry, the second threshold so as to reduce the accumulated error; and
   in response to determination that the accumulated error is negative, moving, by the first circuitry, the second threshold so as to increase the accumulated error.

11. A receiver device for receiving an input signal from a transmitter and measuring values of pulse response cursors in the input signal, the receiver device comprising:
   first circuitry; and
   memory,
   wherein the first circuitry is configured to:
   convert the input signal into a data signal, wherein the data signal includes data symbols transmitted in successive unit intervals (UIs);
   determine a first threshold associated with a first symbol type;
   adjust a gain of the receiver device such that an average amplitude of data signal samples, when receiving data symbols having the first symbol type, corresponds to the first threshold;
   determine a second threshold that corresponds to an average amplitude of the data signal samples when data symbols of a current UI have the first symbol type and data symbols of a first UI, at a first determined time distance from the current UI, have a second symbol type; and
   compute, as a first cursor value associated with the first UI, a first difference between the first threshold and the second threshold, multiplied by a first constant.

12. The receiver device of claim 11, wherein the first circuitry is further configured to:
   determine a third threshold associated with a third symbol type that is different from the first symbol type;
   adjust a gain of the receiver device such that an average amplitude of the data signal samples, when receiving data symbols having the third symbol type, corresponds to the third threshold;
   determine a fourth threshold that corresponds to an average amplitude of the data signal samples when data symbols of the current UI have the third symbol type and data symbols of the first UI have the second symbol type;
   compute a second difference between the third threshold and the fourth threshold, multiplied by a second constant; and
   compute, as a second cursor value associated with the first UI, an average of the first difference and the second difference.

13. The receiver device of claim 11, wherein the first circuitry is further configured to:
   determine a fifth threshold that corresponds to an average amplitude of the data signal samples when data symbols of the current UI have the first symbol type and data symbols of the first UI have a fourth symbol type that is different from the second symbol type;
   compute a third difference between the first threshold and the fifth threshold, multiplied by a third constant; and
   compute, as a third cursor value associated with the first UI, an average of the first difference and the third difference.

14. The receiver device of claim 11, wherein:
   the first threshold is a plurality of first thresholds associated with different symbol types, and
   the second threshold is a plurality of second thresholds associated with different symbol types,
   the first circuitry is further configured to:
   compute a plurality of differences, each difference being a difference between one of the plurality of first thresholds and one of the plurality of second thresholds; and
   compute, as a fourth cursor value associated with the first UI, an average of the plurality of differences multiplied by respective constants.

15. The receiver device of claim 11, wherein in adjusting the gain of the receiver device, the first circuitry is further configured to:
   adjust the gain of the receiver device such that a median amplitude of the data signal samples, when receiving the data symbols having the first symbol type, corresponds to the first threshold.

16. The receiver device of claim 11, wherein in determining the second threshold, the first circuitry is further configured to:
   determine the second threshold that corresponds to a median amplitude of the data signal samples when the data symbols of the current UI have the first symbol type and the data symbols of a first UI have the second symbol type.

17. The receiver device of claim 11, wherein the second threshold corresponds to the first cursor value plus a non-zero value.

18. The receiver device of claim 11, wherein in determining the first threshold, the first circuitry is further configured to:
   determine the first threshold that corresponds to an average amplitude of the data signal samples when data symbols of the current UI have the first symbol type.

19. The receiver device of claim 11, further comprising:
   an accumulator,
   wherein in determining the second threshold:
   the accumulator is configured to accumulate, as an accumulated sign of error, a difference between the second threshold and an amplitude of the data signal samples when the data symbols of the current UI have the first symbol type and the data symbols of the first UI have the second symbol type; and
   the first circuitry is further configured to move the second threshold until the accumulated sign of error becomes zero.

20. The receiver device of claim 11, wherein in determining the second threshold:
   the accumulator is further configured to determine whether the accumulated error is positive or negative;
   in response to determination that the accumulated error is positive, the first circuitry is further configured to move the second threshold so as to reduce the accumulated error; and
   in response to determination that the accumulated error is negative, the first circuitry is further configured to move the second threshold so as to increase the accumulated error.

* * * * *